United States Patent [19]

Murakami et al.

[11] Patent Number: 4,903,279
[45] Date of Patent: Feb. 20, 1990

[54] RECEIVER FOR SPREAD SPECTRUM COMMUNICATION AND RECEIVING METHOD FOR THE SAME

[75] Inventors: Yuichi Murakami; Tomohiro Yamamoto, both of Kawasaki, Japan

[73] Assignee: Aisin Seiki Kabushiki Kaisha, Kariya, Japan

[21] Appl. No.: 102,731

[22] Filed: Sep. 30, 1987

[30] Foreign Application Priority Data

Sep. 30, 1986 [JP] Japan .................. 61-232992
Sep. 30, 1986 [JP] Japan .................. 61-232993
Sep. 30, 1986 [JP] Japan .................. 61-232994

[51] Int. Cl.$^4$ .......................... H04K 1/00; H04L 9/00
[52] U.S. Cl. ........................................................ 375/1
[58] Field of Search ............................. 375/1; 380/34

[56] References Cited

U.S. PATENT DOCUMENTS

| | | | |
|---|---|---|---|
| 4,164,628 | 8/1979 | Ward et al. ................ | 375/1 |
| 4,291,409 | 9/1981 | Weinberg et al. .......... | 375/1 |
| 4,442,527 | 4/1984 | Munday ..................... | 375/1 |
| 4,470,145 | 9/1984 | Williams .................... | 375/1 |
| 4,651,327 | 3/1987 | Fujita ........................ | 375/1 |
| 4,653,068 | 3/1987 | Kadin ........................ | 375/1 |
| 4,653,069 | 3/1987 | Roeder ...................... | 375/1 |
| 4,689,626 | 8/1987 | Hori et al. ................. | 375/1 |
| 4,701,934 | 10/1987 | Jasper ....................... | 375/1 |
| 4,763,103 | 8/1988 | Galula et al. .............. | 375/1 |
| 4,774,715 | 9/1988 | Messenger ................. | 375/1 |

FOREIGN PATENT DOCUMENTS

| | | |
|---|---|---|
| 60-28170 | 3/1985 | Japan . |
| 60-224345 | 8/1985 | Japan . |
| 60-249445 | 10/1985 | Japan . |
| 60-177719 | 11/1985 | Japan . |

*Primary Examiner*—Salvatore Cangialosi
*Attorney, Agent, or Firm*—Banner, Birch, McKie & Beckett

[57] ABSTRACT

The present invention discloses a receiver and a receiving method for spread spectrum communication for use in the digital communication system. The receiver basically comprises a receiving circuit, a spread signal distributing circuit, a pseudo noise signal generating circuit, an activating circuit, correlation detecting circuits, an initial seizing control circuit, a synchronization sustaining control circuit, a synchronization control circuit and a demodulating circuit. If a phase lock condition is broken within a short period of time, such condition is sustained until phase lock is recovered so that communication can be started again immediately after phase lock is recovered without initialization for each asynchronization. The receiving circuit is very much simplified and particularly, the Costas Loop demodulating circuit detects the phase lock condition when the signal obtained by multiplying the signal of which phase is shifted by 90° and the reversely spread signal is within the preset range without using a phase shifter or other multiplying circuit. Accordingly the circuit structure of the receiver as a whole can be simplified.

20 Claims, 15 Drawing Sheets

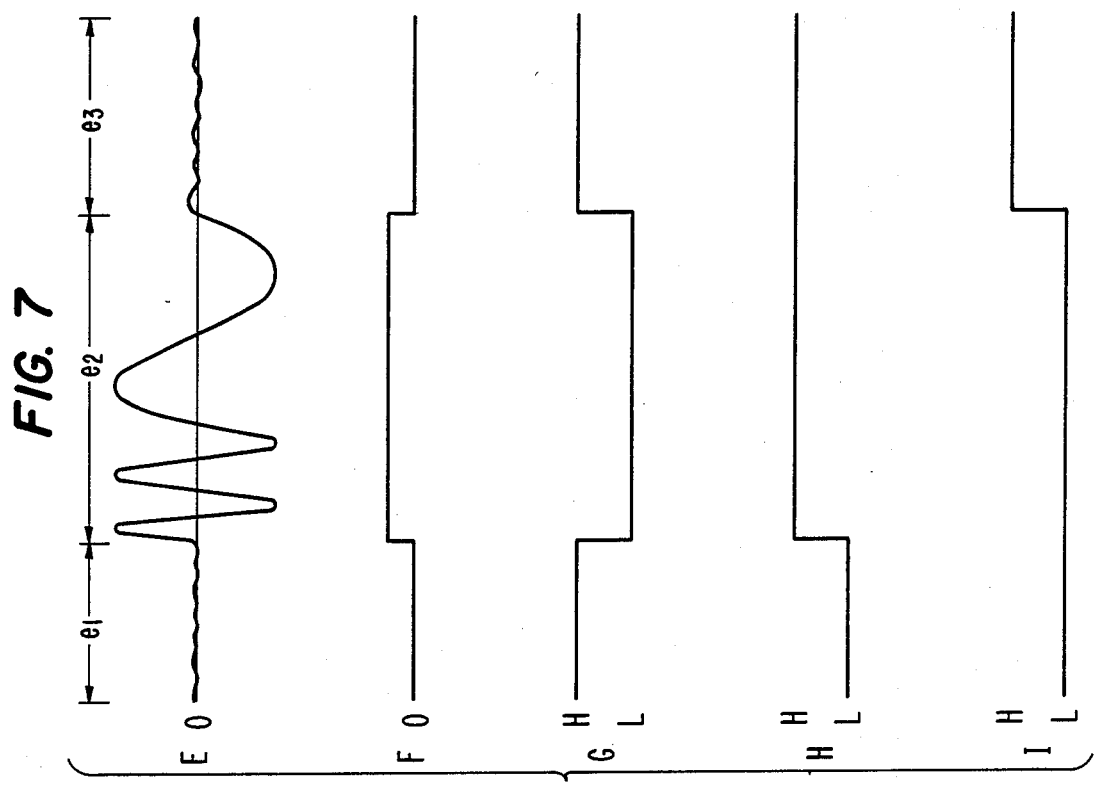
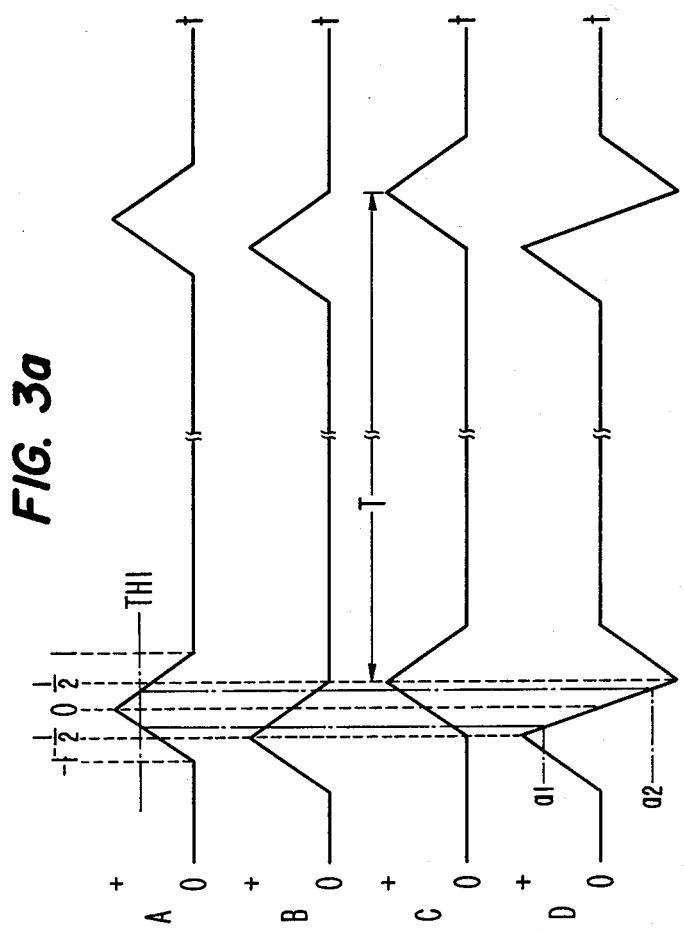
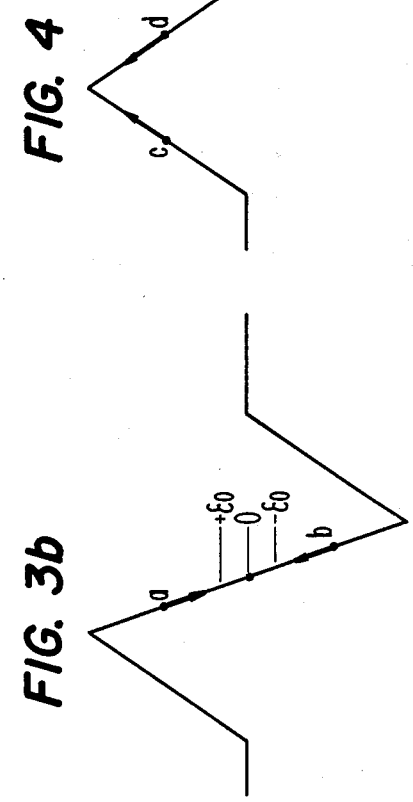

FIG. 5a
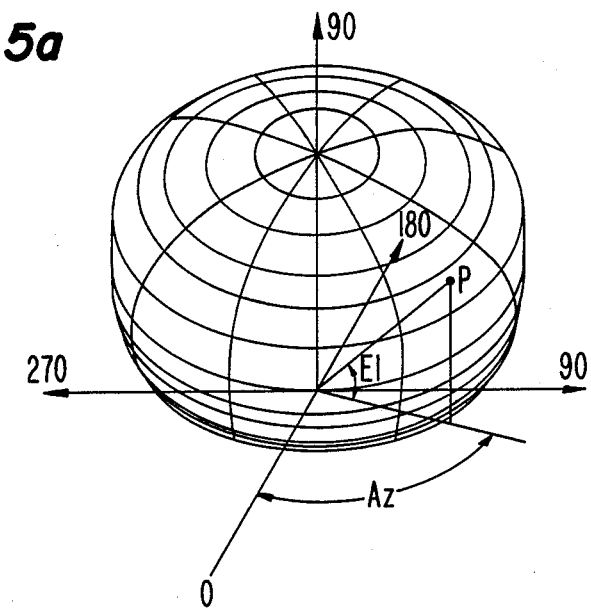
FIG. 5b
| Az \ El | 01 | 02 | 03 |   |
|---|---|---|---|---|
| 01 |  |  |  |  |
| 02 |  |  |  |  |
| 03 |  |  |  |  |
| 04 |  |  |  |  |
FIG. 6a
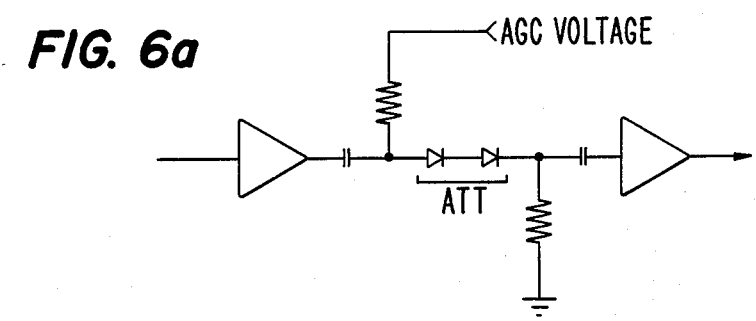
FIG. 6b
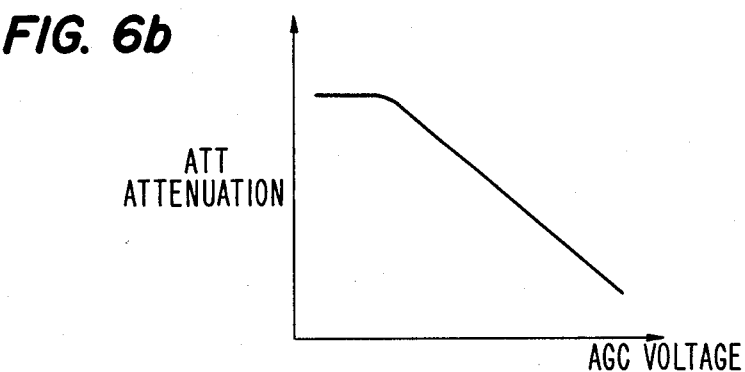

RECEIVER FOR SPREAD SPECTRUM COMMUNICATION AND RECEIVING METHOD FOR THE SAME

FIELD OF THE INVENTION

The present invention relates to a receiver for use in a spread spectrum communication system.

BACKGROUND OF THE INVENTION

The spread spectrum communication (hereinafter referred to as SS communication) system is a digital transmission system and is characterized particularly in that information to be transmitted is spread into a wider frequency band than that required for transmission.

For a SS communication, data is spread in the sending side with a pseudo noise signal (hereinafter referred to as PN code) of the code series specified previously between the sending and receiving sides and such data is then reversely spread using the PN code series of the same code series in the receiving side. Therefore, if codes in the sending and receiving sides are not synchronized accurately, data cannot be transmitted and received.

Accordingly, a receiver utilizing a DLL (Delay Lock Loop) circuit has been proposed. The receiver utilizing the DLL circuit comprises a receiving circuit to receive the spread spectrum signal transmitted from a transmitter, a first correlation circuit which reversely spreads the received spread spectrum signal with the PN code train of the reference phase, a second correlation circuit which reversely spreads the received spread spectrum signal with the PN code train which is delayed by ½ bit from the reference phase, a third correlation circuit which reversely spreads the receiver spread spectrum signal which leads by ½ bit from the reference phase of the PN code train, a hybrid circuit which differentially combines outputs of the second correlation circuit and the third correlation circuit and a demodulation circuit which is connected to said correlation circuit and extracts data elements from the received spread spectrum signal. That is, the receiver first reversely spreads, in an initial seizing operation, received spread spectrum signals by generating a PN code train with a bit rate quicker than that in the sending side. When the first correlation circuit detects the peak of correlation between the spread spectrum signal which has been reversely spread and the PN code train of the reference phase, the receiver establishes a temporary synchronization by generating a PN code train with a bit rate equal to that in the sending side and finally establishes the phase lock condition by adjusting the bit rate so that an output of a hybrid circuit becomes 0 through the synchronization sustaining control.

Since a large amount of energy can be extracted from an SS communication only when correlation exists between the PN code trains of the sending and receiving sides, this communication system is widely employed, for example, for satellite communication which is resistive to noise and establishes communication, for example, using a weak signal.

For instance, when a receiver is installed into a mobile vehicle, a receiving antenna is often shielded temporarily by buildings or tunnels. Therefore, the receiver often generates asynchronization easily when it is installed in a moving object for mobile communication.

In addition, if the PN codes are asynchronized for some reason after establishing the phase lock, the conventional receiver reestablishes the phase lock again by re-executing the initial seizing control operation.

The PN code train used in SS communication is required to have sufficient resistivity to noise. Therefore, the PN code is also required to have a certain bit length which is necessary for a circulation of PN codes.

In the initial seizing control operation, correlation is detected, for example, by shifting one bit for each circulation of a PN code train. Therefore, when the bit length of a PN code is long, the receiver requires a comparatively longer period for reestablishing the phase lock. As described above, it is impossible to send or receive data for the SS communication if the codes are not accurately synchronized between the sending and receiving sides. Accordingly, the conventional receiver has a disadvantage in that communication is suspended for a considerable period if asynchronization occurs.

Moreover, when communication with a moving satellite is necessary, the frequency of received signal is deviated from the sending frequency due to a Doppler shift. The amount of such Doppler shift always changes.

As a means for tracking the frequency which always changes, an AFC (Auto Frequency Control) circuit has been proposed. However, in SS communication, it is often difficult to track the frequency by using the AFC circuit, because the carrier is not contained in the signal in many cases in SS communication. Therefore, the conventional receiver executes the frequency tracking in conjunction with the first correlation circuit and demodulation circuit. As a result, the conventional receiver also provides a disadvantage in that the receiving circuit is very complicated.

Moreover, SS communication systems often use the BPSK (Biphase Phase Shift Keying) signal. Accordingly, in many cases, the Costas Loop circuit is used as the demodulating circuit.

With reference to FIG. 2e, the conventional Costas Loop demodulating circuit is briefly described hereunder.

The Costas Loop demodulating circuit is composed of three multipliers. The first multiplier multiplies a VCO output and the reversely spread signal, while the second multiplier multiplies the signal obtained by shifting the phase of VCO output by 90° and the reversely spread signal and the third multiplier multiplies outputs of the first and second multipliers. An output of the third multiplier controls VCO so that the phase difference between the VCO output and the reversely spread signal can be suppressed to zero. Namely, VCO of Costas Loop demodulating circuit tracks the virtual carrier and therefore the demodulated data can be obtained at the first multiplier output. However, since this output does not contain the amplitude information, it is impossible to judge whether VCO accurately tracks the virtual carrier (i.e. the Costas Loop demodulating circuit locks) or not.

In order to judge whether the Costas Loop demodulating circuit locks or not, the conventional receiver multiplies the signals obtained by shifting VCO output by +45° and the reversely spread signal using the 4th and 5th multipliers and also multiplies the outputs of 4th and 5th multipliers using the 6th multiplier.

Accordingly, the conventional receiver further requires three multipliers and phase shifters for shifting the phases ±45° in order to judge the lock of the Costas Loop demodulating circuit, resulting in a problem that the circuit structure is very complicated. In addition, a problem arises in that an increase of frequency used for SS communication complicates the design of the phase shifter.

SUMMARY OF THE INVENTION

It is therefore a first object of the present invention to solve the problems of the prior art described previously.

It is a second object of the present invention to simplify the circuit structure of a receiver for use in a SS communication system.

It is a third object of the present invention to shorten the time until communication is recovered after the communication is suspended.

It is a fourth object of the present invention to realize tracking for the receiving frequency.

It is a fifth object of the present invention to detect a locked condition of a Costas Loop demodulating circuit with a simplified circuit.

Further objects and advantages of the present invention will be apparent from the following description with reference to the accompanying drawings to which, however, the scope of the invention is in no way limited.

BRIEF DESCRIPTION OF THE DRAWINGS

FIG. 3b is a schematic waveform relating to the synchronization sustaining processing, FIG. 4 is a schematic waveform relating to the Doppler compensation processing, FIG. 5a is a graph of a radiation pattern of the receiving antenna, FIG. 5b is a schematic plan view of the antenna gain compensation data table stored in the microcomputer 10 shown in FIG. 1b and FIG. 2b, FIG. 6a is a detailed circuit diagram of the AGC amplifier circuit shown in FIG. 1a, FIG. 6b is a graph indicating characteristics of the AGC amplifier circuit of FIG. 6a, FIG. 7 indicates output waveforms at respective points of the Costas Loop demodulating circuit shown in FIG. 1c, and FIG. 8, FIG. 9, FIG. 10, FIG. 11, FIG. 12 and FIG. 13 are flowcharts which indicate some of the control executed by microcomputer 10 shown in FIG. 1b and FIG. 2b.

DETAILED DESCRIPTION OF THE INVENTION

Figure 2A:
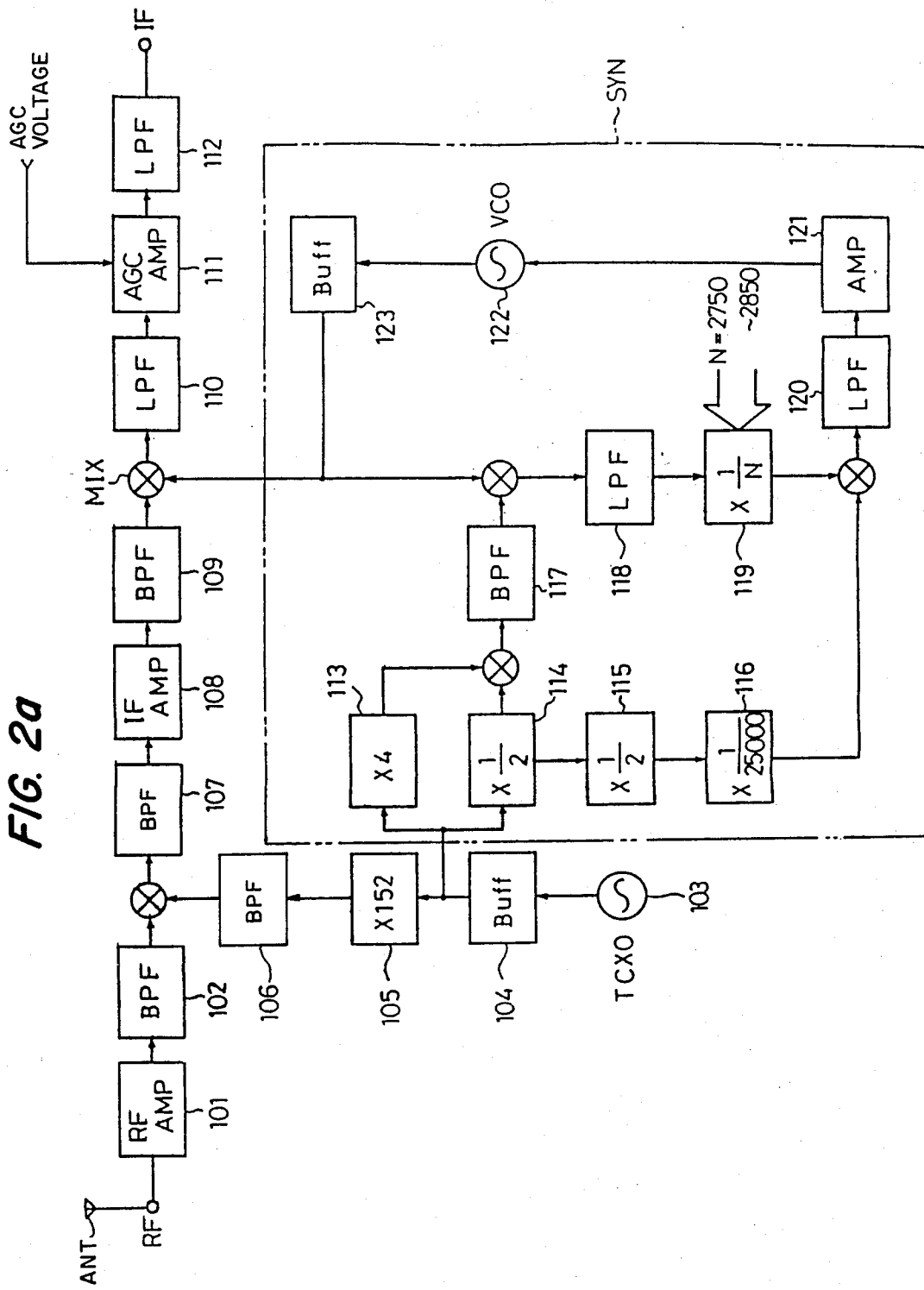
FIG. 2a is a block diagram of a receiving circuit for use in the receiver of the present invention.
Figure 2B:
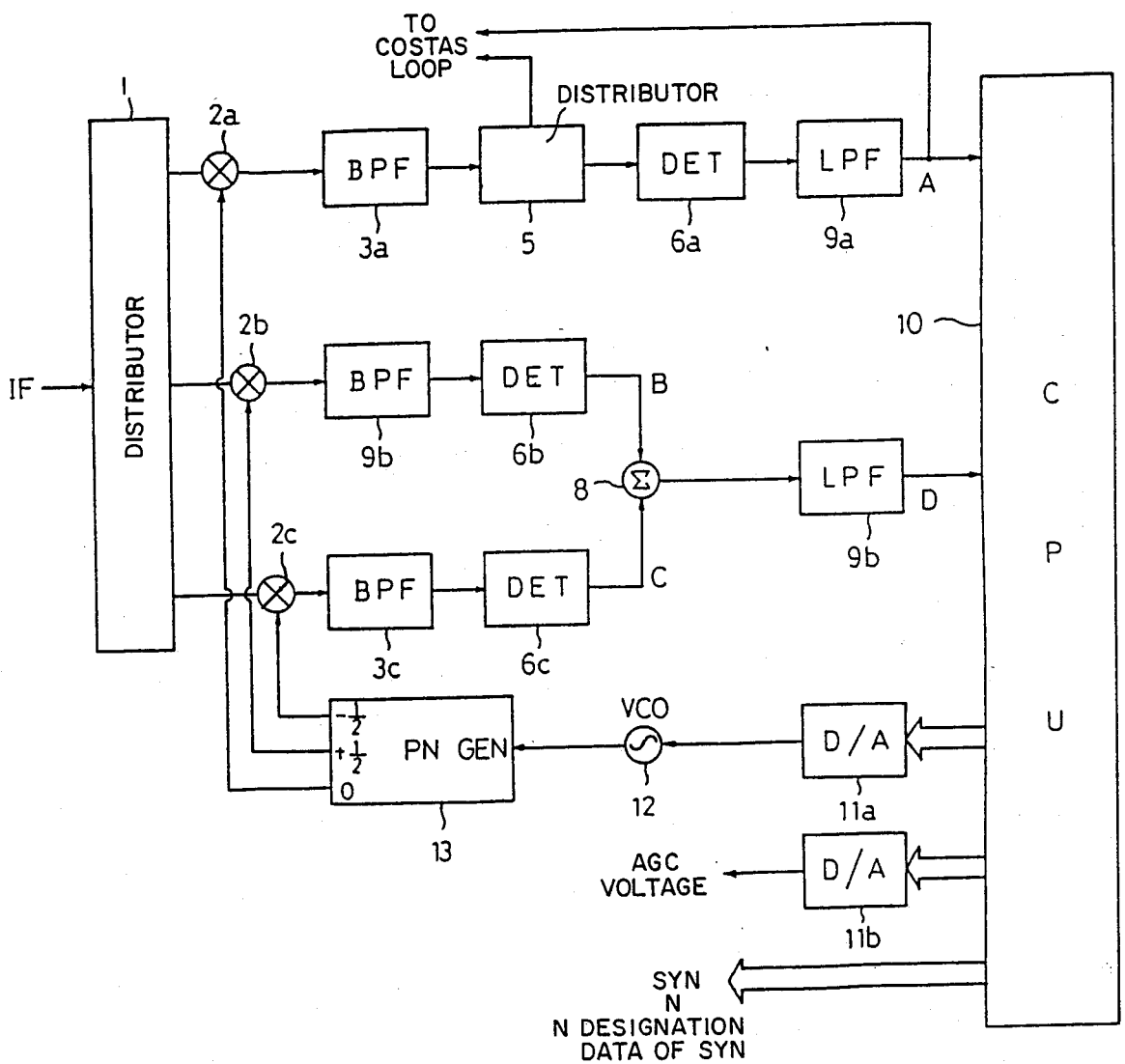
FIG. 2b is a block diagram of a reverse spread circuit for use in the receiver of the present invention.
Figure 2C:
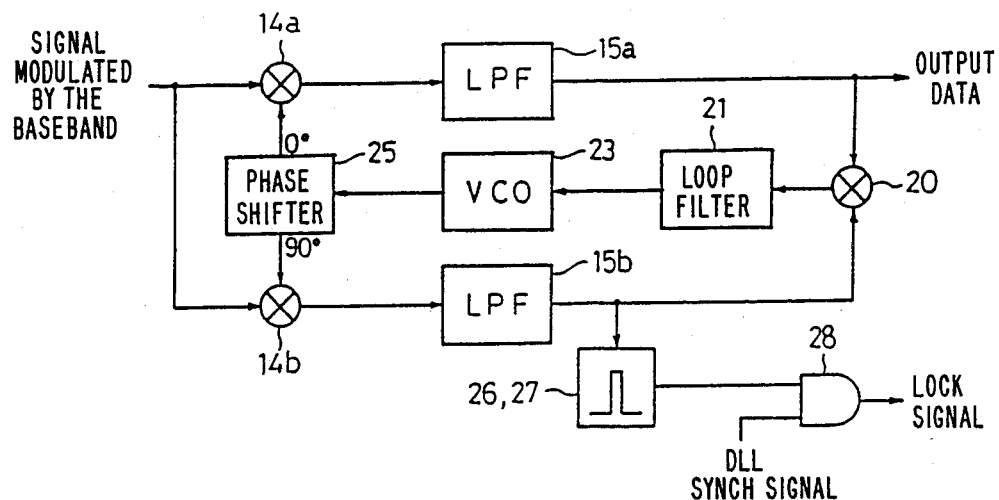
FIG. 2c is a block diagram of a Costas Loop demodulating circuit for use in the receiver of the present invention.
Figure 2E:
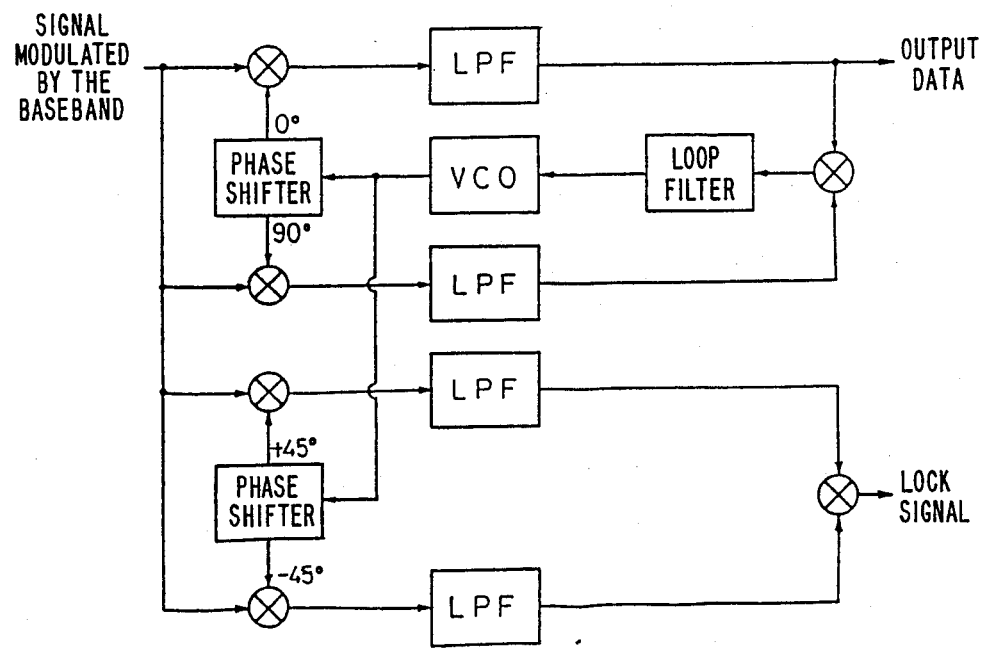
FIG. 2e is a block diagram of a conventional Costas Loop demodulating circuit.
Figure 2D:
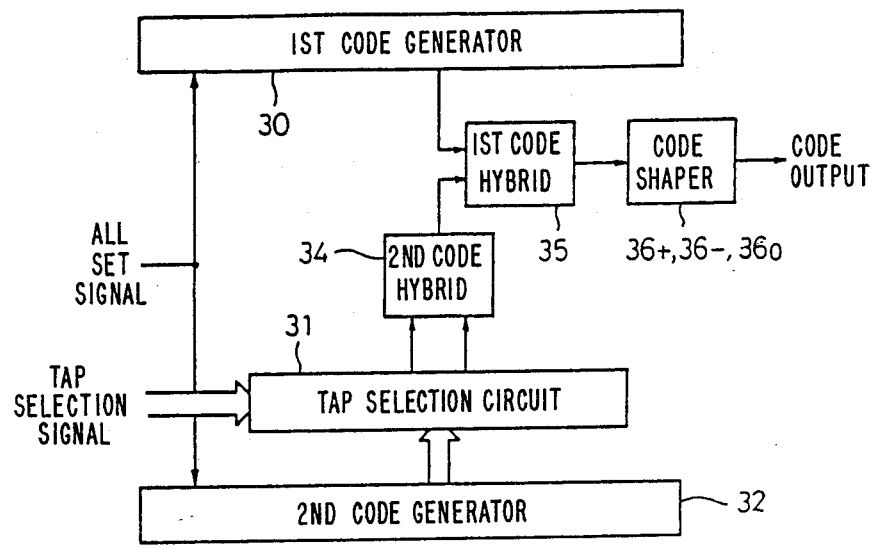
FIG. 2d is a block diagram of a PN code generator for use in the receiver of the present invention.
Figure 2F:
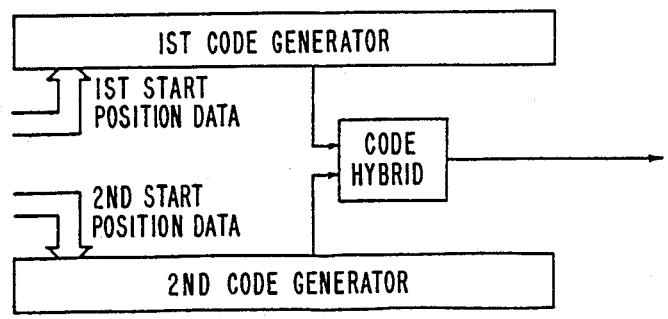
FIG. 2f is a block diagram of a conventional PN code generator.
Figure 2G:
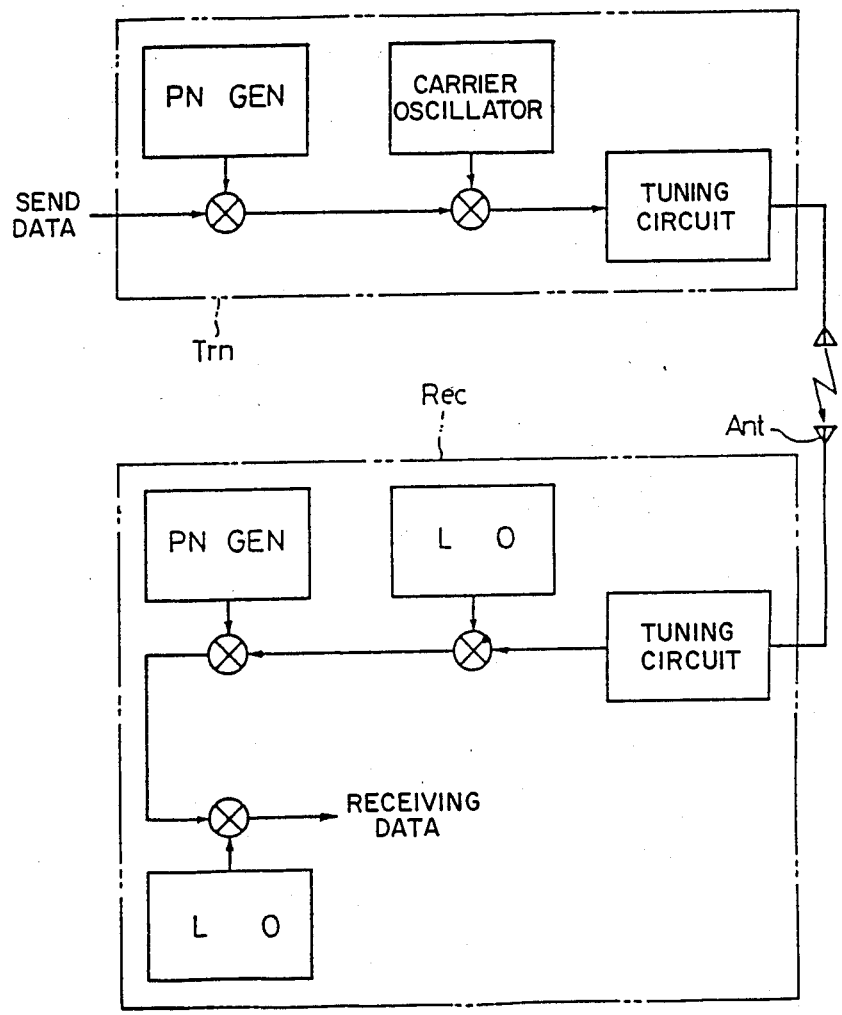
FIG. 2g is a block diagram of a communication system to which the receiver of the present invention may be applied, FIG. 3a indicates waveforms of correlation conducted by a microcomputer 10 shown in FIG. 1b and FIG. 2b.

An embodiment of the present invention is outlined hereunder with reference to FIG. 2g. FIG. 2g is a block diagram illustrating the sending/receiving system in the SS (Spread Spectrum) system.

A transmitter Trn spreads the sent data with a PN (Pseudo Noise) code having a bit rate higher than that of said sent data, executed BPSK (Biphase Phase Shift Keying) to the carrier with said spread signal and then transmits the signal through a tuning circuit. The sent data used in this embodiment includes information which indicates transmission. A receiver Rec, meanwhile, mixes a radio frequency signal obtained through the tuning circuit with a local oscillation signal, then reversely spreads the signal by adding the PN code which is the same as that in the sending side, demodulates said reversely spread signal at the BPSK demodulating circuit and finally obtains the receiving data.

This embodiment relates to the receiver Rec, which receives the signal which is obtained by executing the BPSK to the carrier of 1575 MHz with the signal obtained by spreading the send data of 50 b/s (bit per second) with the PN code of 1.023 Mb/s. FIG. 1a, FIG. 1b, FIG. 1c and FIG. 1d are circuit diagrams indicating the detailed structure of a part of the device of this embodiment, while FIG. 2a, FIG. 2b, FIG. 2c and FIG. 2d are block diagrams indicating an outline of the structure of the device of this embodiment. The following description is made with reference to these drawings.

a. Generation of intermediate frequency signal

With reference to FIG. 2a, the signal received through the antenna Ant (in this embodiment, preferably circular polarized wave microstrip antenna) is mixed with a first local oscillation signal through a radio frequency amplifier 101 and a band-pass-filter 102 and is converted into a first intermediate frequency signal. TXCO 103 is a temperature-compensated crystal-controlled oscillator which oscillates the signal of 10 MHz. Namely, the first local oscillation signal 1520 MHz is obtained by multiplying 152 times such oscillated signal with a ×152 multiplier 105 and the first intermediate frequency signal considering the Doppler shift etc. becomes the signals having the frequencies of 55.42 MHz±5 kHz. The first intermediate frequency signal is filtered and amplified by the band-pass-filter 107, first intermediate frequency amplifier 108 and band-pass-filter 109, then mixed with a second local oscillation signal and converted to a second intermediate frequency signal.

SYN is a synthesizer which oscillates the second local oscillation signal and functions as the second local oscillator. Here, the output in frequency from 10 MHz of TCXO 103 is applied through buffer 104 and is multiplied by 4 times (40 MHz) with a ×4 multiplier 113 and divided to ½ times (5 MHz) with a (½)multiplier 114. The first signal of 45 MHz can be generated by combining these signals. On the other hand, an output (5 MHz) of the (½)multiplier 114 is further divided to 1/50000 times by the (½)multiplier and (1/25000) multiplier and becomes the second signal.

Here, considered is the case that VCO 122 outputs the second local oscillation signal of 44.72 MHz and the (1/N)multiplier 119 is set to 1/2800 times. In this case, the first signal of 45 MHz and the second local oscillation signal of 44.72 MHz are mixed, a lower frequency signal (280 kHz) is extracted by a low-pass-filter 118 and the signal divided to 1/2800 times by the (1/N)multiplier 119 becomes the signal of 100 Hz. This signal is mixed with the second signal (100 Hz) and is then filtered by a low-pass-filter 120. Thereby, a voltage signal DC-amplified by the amplifier 121 is applied to VCO 122. Namely, a voltage signal to be applied to VCO 122 changes by changing an amplification coefficient of the (1/N) multiplier 119.

VCO 122 outputs the second local oscillation signal of 44.72 MHz±5 kHz in accordance with deviation from 0 v of the input voltage signal. The oscillation frequency of the second local oscillation signal is controlled by setting the multiplication coefficient of (1/N) multiplier 119 in the Doppler compensation processing explained later.

Since the first intermediate frequency signal is 55.42 MHz±5 kHz, the mixer MIX mixes this signal with the second local oscillation signal of 44.72 MHz±5 kHz (regarding the value after the sign +, the deviation of both values must be adjusted equally) and allows the mixed signal to pass through a low-pass-filter 110 in order to obtain the second intermediate frequency signal of 10.7 MHz. This second intermediate frequency signal is level-adjusted in the AGC amplifier 111 and is then applied to the reverse spread circuit in the next stage through a low-pass-filter 112. The AGC amplifier 111 of this embodiment is an attenuator ATT formed by a diode as indicated in FIG. 6a, utilizing the property that when the anode to cathode voltage is large, the forward resistance becomes small, but when such voltage is large, said resistance becomes large. The relation between a voltage applied to the anode of the diode, namely the AGC voltage and forward resistance of diode, namely attenuation of attenuator ATT is shown in FIG. 6b. In this embodiment level adjustment is carried out utilizing the characteristic of the part where the graph is lowered linearly. The AGC voltage is set by the microcomputer 10 described later.

b. Reverse spread

Figure 1A:
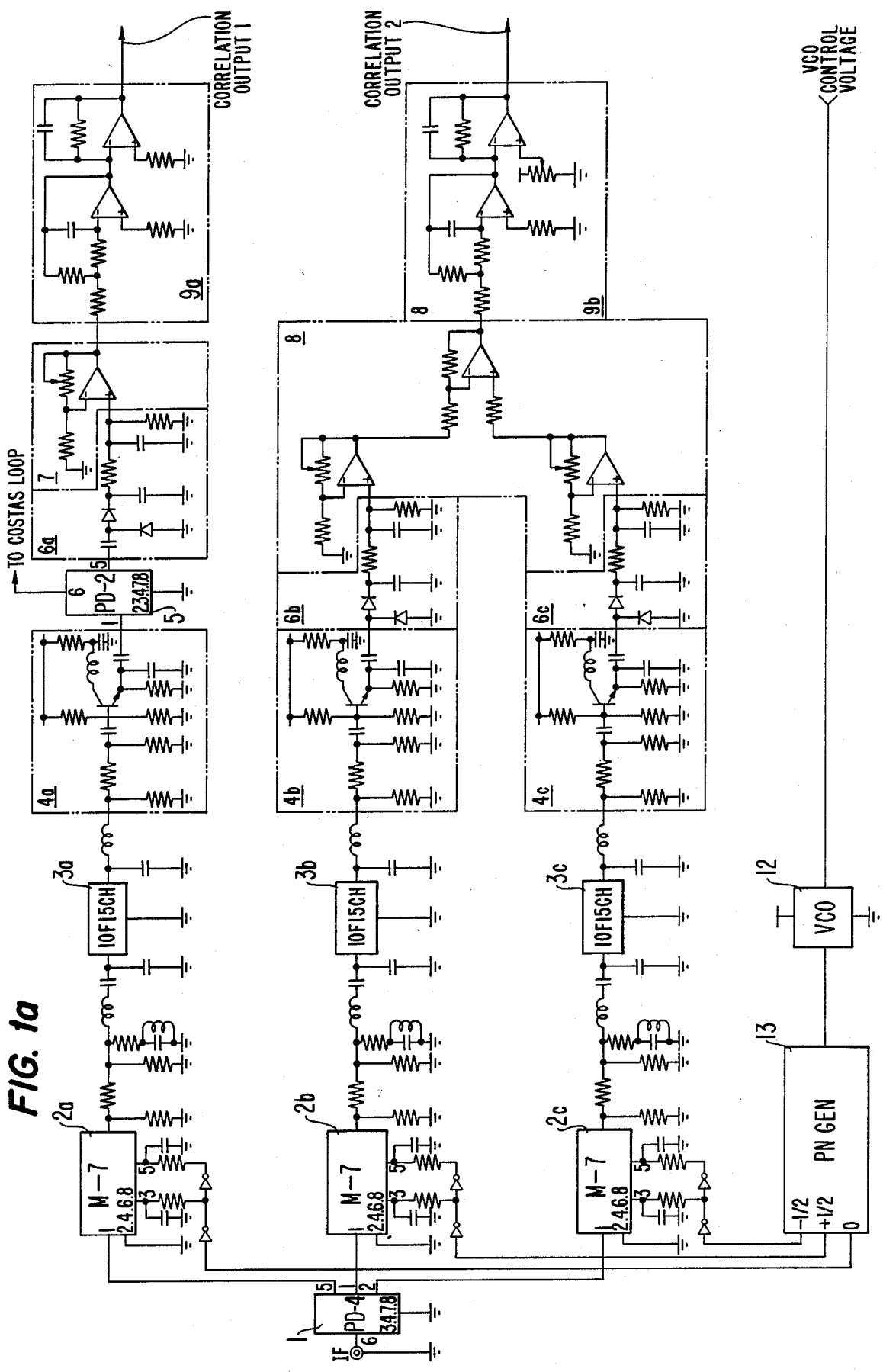
FIG. 1a is a detailed circuit diagram of a reverse spread circuit for use in the receiver of the present invention.
Figure 1B:
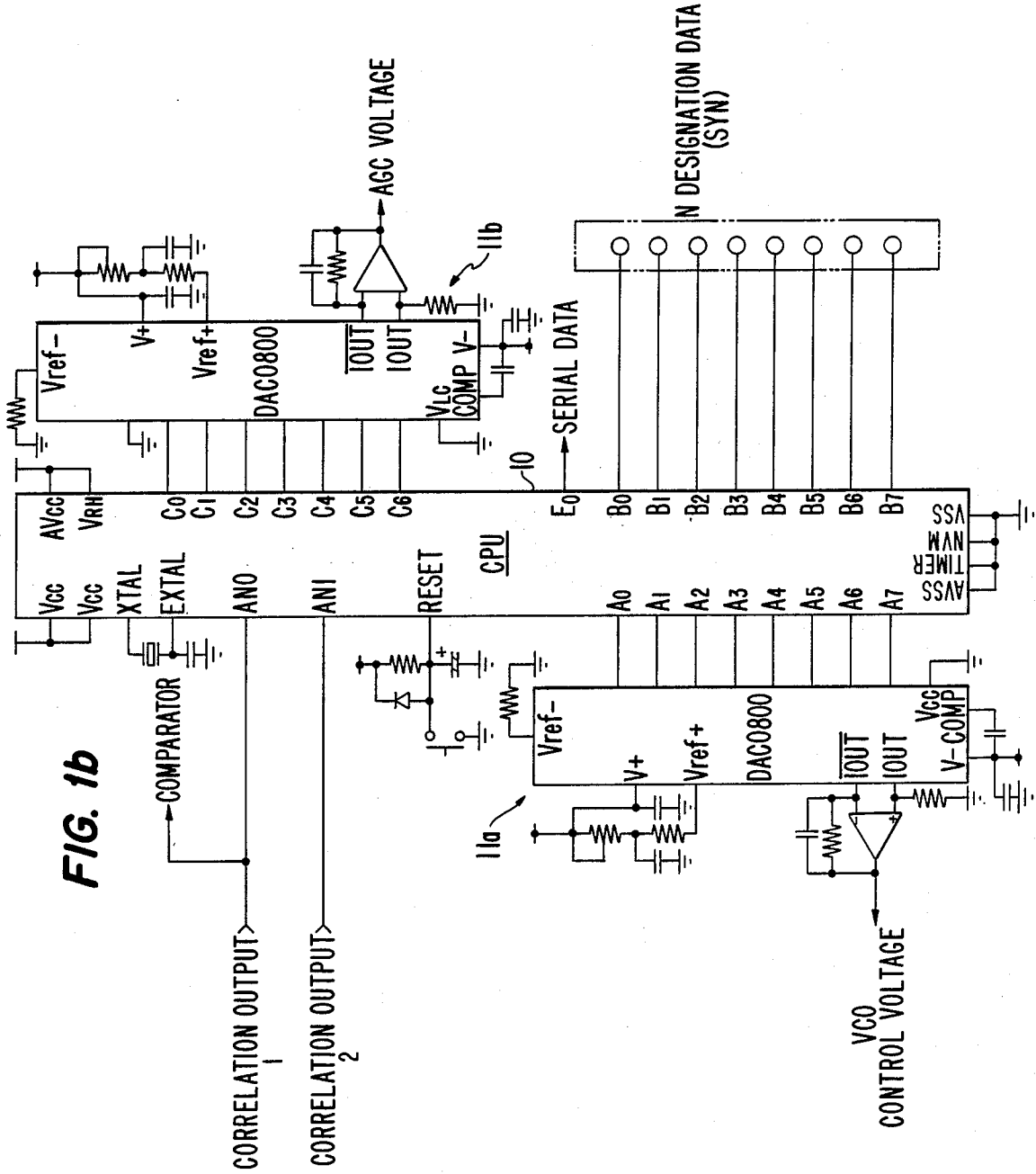
FIG. 1b is a detailed circuit diagram of a reverse spread circuit for use in the receiver of the present invention.

FIG. 1a and FIG. 1b indicate the details of reverse spread circuit of a preferred embodiment of the device. FIG. 2b is a block diagram indicating the outline of the structure of the present invention. Referring to these drawings, the reverse spread circuit is formed by a correlation circuit indicated at the upper part of FIG. 1a or FIG. 2b, a delay lock loop circuit (DLL circuit) indicated at the center part, PN code generating circuit at the lower part and a control circuit indicated in the right side of FIG. 1b or FIG. 2b.

The correlation circuit is composed of a balanced mixer 2a (a double balanced mixer M-7 manufactured by R and K Corp. is used in this embodiment: same as 2b, 2c), a narrow band filter 3a (a crystal-controlled filter 10F15CH manufactured by NDK Corp. is used in this embodiment: same as 3b, 3c), an amplifier circuit 4a, a distributor 5 (a 2-way distributor PD-2 manufactured by R and K Corp. is used in this embodiment), a detector circuit 6a, a buffer amplifier 7 and a low-pass-filter 9a.

The DLL circuit is composed of a first correlation circuit comprising a balanced mixer 2b, a narrow band filter 3b, an amplifier circuit 4b and a detector circuit 6b, a second correlation circuit comprising a balanced mixer 2c, a narrow band filter 3c, an amplifier circuit 4c and a detector circuit 6c, a differential amplifier circuit 8 and a low-pass-filter 9b.

A code generating circuit is formed by VCO 12 and PN code generator 13.

A control circuit is formed by two D/A converters 11a and 11b (the D/A converter DAC0800 manufactured by Analog Device Corp. is used in this embodiment) in the periphery of the microcomputer 10 (the microcomputer HD63705Z0 manufactured by Hitachi Limited is used in this embodiment).

The second intermediate frequency signal (IF) OF 10.7 MHz is equally distributed to three balanced mixers 2a, 2b and 2c by the distributor 1 (the 3-way distributor PD-4 manufactured by R and K Corp. is used in this embodiment). The PN code train of the reference phase is applied to the balanced mixer 2a from the PN code generator 13, while the PN code train having a phase shifted by +½ bit from the reference phase to the balanced mixer 2b and the PN code train having a phase shifted by −½ bit from the reference phase to the balanced mixer 2c, respectively.

Although the PN code generator 13 is described later, the PN code train used in this embodiment is a Gold Code train which makes a circulation with 1023 bits and this PN code train is equal to that used for transmission. Therefore, when the PN code train generated by the PN code generator 13 is synchronized with the PN code train included in the received signal, outputs of balanced mixers 2a, 2b, 2c are compressed (reverse spread) around the second intermediate frequency signal of 10.7 MHz, resulting in a concentration of energy. In this case, since and signal including little or no correlation, for example, the interference wave or noise, is spread, to the contrary, by using the PN code, only a signal including the sent data can be extracted through the narrow band filters 3a, 3b, 3c around the center frequency of 10.7 MHz.

The code synchronization is explained below.

Since the PN code train generated by the PN code generator 13 is equal to the PN code train included in the received signal, if the PN code generator 13 is started from the desired starting position, the frame matching the codes of all bits certainly exists until the bits of the PN code train generated are shifted bit by bit sequentially up to 1023 bits. Therefore, the code synchronization can be realized by detecting such frame and eliminating the shift of code train from such timing.

More concretely, the shift of one bit is generated for the PN code train included in the received signal for each circulation of the code train generated by driving the PN code generator 13 with the bit rate of 1.024 Mb/s. Since the PN code train generated from the PN code generator 13 is applied to the balanced mixers 2a, 2b, 2c, when the frame matching all bits exists, the second intermediate frequency signals of respective outputs are compressed around the center frequency of 10.7 MHz as described previously but such outputs are spread and energy is not concentrated if the bits are shifted even a bit.

Accordingly, the peak appears when the codes match at the output end A resulting in the correlation output 1 which falls to the noise level with a shift of one bit, by detecting an output of the narrow band filer 3a by a envelope detecting method at the detector 6a and filtering the output with the low-pass-filter 9a.

The waveform A of FIG. 3a indicates such correlation output 1. Here, the period T is the time until correlation is attained after further shift of 1023 bits. Therefore, the correlation output 1 is watched and when the level has exceeded the threshold level TH1, it is defined as a temporary lock condition and the bit rate of PN code generator 13 is set to 1.023 Mb/s (initial seizure). That is, when both code trains match, deviation of the PN code generator 13 is eliminated. On the other hand, since the code train which leads ½ bit the PN code train which is applied to the balanced mixer 2b, as explained previously, an output indicated by the correlation waveform which is deviated by ½ bit to the left (led by ½ bit on the time axis) for the waveform A like the waveform B indicated in FIG. 3a can be obtained at said first correlation circuit of DLL circuit, and since the code train delayed by ½ bit from the PN code train to be applied to the balanced mixer 2a is applied to the balanced mixer 2c, as explained previously, an output indicated by the correlation waveform deviated by ½ bit to the right (delayed by ½ bit on the time axis) from the waveform A like the waveform C indicated in FIG. 3a can be obtained at said correlation circuit of DLL circuit.

These outputs are combined in the differential amplifier circuit 8 and the correlation output 2 indicated by the waveform D of FIG. 3a can be obtained at the DLL circuit.

With reference to FIG. 3a, the correlation output 2 changes between $a_1$ and $a_2$ under the temporary lock condition. The code locking can be completed by adjusting the bit rate (output frequency of VCO 12) of the PN code generator 13 so that such output becomes 0.

For instance, in FIG. 3b, when the level of correlation output 2 is a, the output frequency of VCO is set high and when such level is b, the output frequency of VCO is set low. However, since it is impossible to set the correlation output 2 to 0, a control is always necessary to set such level within a range of $\pm\epsilon_0$ (sustaining the lock condition).

The signal reversely spread in the balanced mixer 2a is used for the initial seizure and moreover is distributed by the distributor 5 and then applied to the Costas Loop demodulating circuit in the next stage (this is a so-called paradox and it is rather correct to think that the initial seizure is executed by monitoring the energy distribution of the signal to be applied to the Costas Loop demodulating circuit through the reverse spread). When the code locking is completed, the signal to be applied to the Costas Loop demodulating circuit becomes the modulation wave of 10.7 MHz modulated by the base band (subjected to BPSK by the data of 50 b/s).

The analog input port AN0 of the microcomputer (hereinafter referred to as CPU) 10 is connected to the low-pass-filter 9a, while the analog input port AN1 is connected to the low-pass-filter 9b, respectively. Moreover, the output ports $A_0 \sim A_7$ are connected to the D/A converter 11a, output ports $B_0' \sim B_7$ are connected to the (1/N) multiplier 119 of synthesizer SYN (FIG. 2a) and the output ports $C_0 \sim C_6$ are connected to the D/A converter 11b.

The D/A converter 11a generates a voltage signal (VCO control voltage) in accordance with digital data of 8 bits given from CPU 10 and applies it to VCO 12.

The D/A converter 11b generates a voltage signal (AGC voltage) in accordance with the digital data of 7 bits given from CPU 10 and applies it to the AGC amplifier 111.

Operations of CPU 10 will be explained later but these are outlined here. First, after executing the control for the initial seizure operation and for sustaining lock phase lock condition by adjusting the VCO control voltage while monitoring the AN0 and AN1 inputs, the AN0 input is controlled to the specified value (TH2) by adjusting the AGC voltage. Thereafter, the system is initialized by executing Doppler compensation which maximizes the AN0 input through the control of the oscillation frequency of SYN. Thereafter, the Doppler compensation is executed in the specified period by repeating the controls for AGC adjustment and sustaining the phase lock condition. In such repeated controls, if it becomes difficult to sustain the phase lock condition and an asynchronized condition continues for of period longer than the specified period, resynchronization is established by the controls for the initial seizure operation and the repeated controls are then carried out again.

c. Demodulation

Figure 1C:
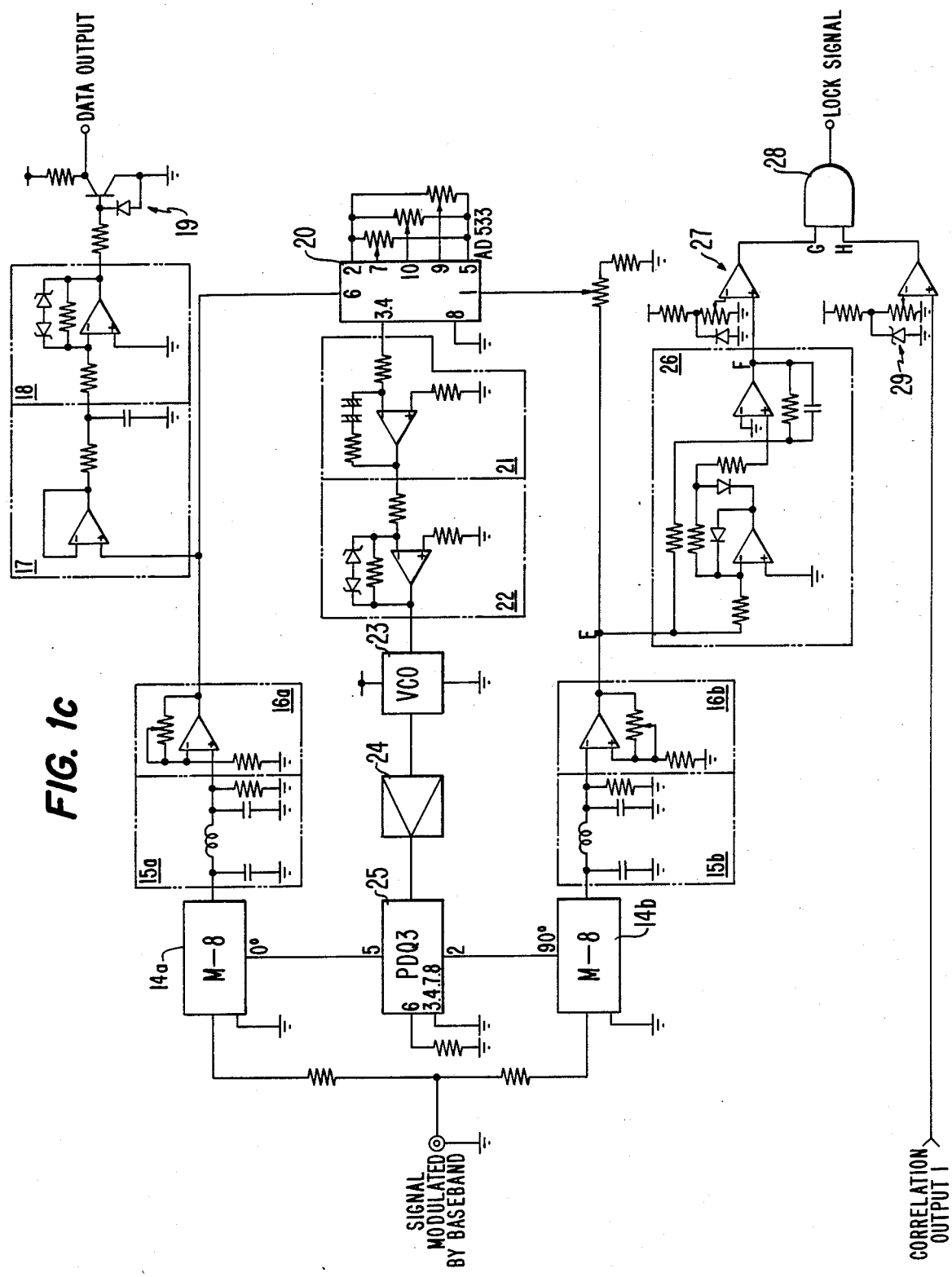
FIG. 1c is a detailed circuit diagram of a Costas Loop demodulating circuit for use in the receiver of the present invention.

FIG. 1c shows details of a Costas Loop demodulating circuit for forming demodulation. FIG. 2c is a block diagram which indicates an outline of the structure of such a demodulating circuit. The following explanation is based on these drawings.

The modulation wave of 10.7 MHz which is modulated by a baseband signal (subjected to BPSK by data of 50 b/s) is input to the Costas Loop demodulating circuit from a distributor 5 of a reverse spread circuit. This input is equally distributed to the balanced mixers (the double balanced mixer M-8 manufactured by R and K Corp. is used in this embodiment) 14a and 14b. Meanwhile, VCO 23 outputs the demodulated signal of 10.7 MHz and applies it to a phase shifter 25 (a hybrid distributor PDQ3 manufactured by R and K Corp. is used in this embodiment) through an amplifier 24. The phase shifter 25 distributes the demodulated signal with phase difference of 90°θ and applies it to the balanced mixers 14a and 14b. The balanced mixer 14a is also called the I (In-phase) multiplier, while the balanced mixer 14b is called the Q (quadrature phase) multiplier. Outputs of the balanced mixers 14a and 14b are respectively filtered by the low-pass-filters 15a, 15b, then amplified by the amplifiers 16a, 16b and are multiplied in the multiplier 20 (the multiplier AD533 manufactured by Analog Device Corp. is used in this embodiment). An output of the multiplier 20 is converted substantially to a DC signal in a loop filter 21 and becomes a control voltage signal of VCO 23 through a limiter 22.

Operations of the Costas Loop demodulating circuit are explained in further detail hereunder.

When the modulation wave modulated by the base-band of input signal is defined as $\pm A \cos(\omega t+\phi)$ and VCO 23 is assumed to output the signal $\cos\omega t$, the phase shifter 25 respectively applies the signal $\cos\omega t$ to the balanced mixer 14a and the signal $\sin\omega t$ to the balanced mixer 14b. Accordingly, an output of the balanced mixer 14a is expressed as $$\pm A/2[\cos\phi + \cos(2\omega t + \phi)] \qquad (1)$$

and an output of the balanced mixer 14a is expressed as $$\pm A/2[\sin\phi + \sin(2\omega t + \phi)] \qquad (2)$$

An output of the balanced mixer 14a is converted to ±A/2 cosφ by filtering it with the low-pass-filter 15a, while an output of the balanced mixer 14b is connected to ±A/2 sinφ by filtering it with the low-pass-filter 15b.

These two signals include the information of send data (BPSK information) and carrier phase. The signal $A^2/2 \sin 2\phi$ can be extracted as an output by multiplying these two signals in the multiplier 20. This output signal includes only the carrier phase. This signal controls VCO through the loop filter and thereby VCO tracks the input carrier wave (the virtual carrier since the carrier is not actually included in the input). Namely, the Costas Loop demodulating circuit operates in order to set phase difference φ to zero.

Here, attention is drawn to the output of the low-pass-filter 15a. When phase difference φ is 0 (Costas Loop demodulating circuit is locked), such output is expressed as ±A/2 using said symbol, including only the BPSK information (data of 50 b/s transmitted). Therefore, it is extracted through a buffer of voltage follower and a block 17 consisting of low-pass-filter. After the level adjustment with a limiter 18, such signal is encoded to a binary signal at the TTL level by a binary encoding circuit 19, thereby providing the BPSK information.

However, this data is extracted only when the Costas Loop demodulating circuit is locked. It may be obvious from the circuit of FIG. 1c. Namely, it is necessary to judge the lock/unlock conditions of the Costas Loop demodulating circuit.

Now attention is drawn to the output of low-pass-filter 15b. When the Costas Loop demodulating circuit is locked, namely when phase difference φ is 0, such output becomes 0 and when φ is deviated from 0 (unlock), the signal ±A/2 sinφ is output in accordance with such value (said symbols are used). The waveform of the signal detected at the point E of FIG. 1c is indicated as E in FIG. 7 but the section e$_2$ is an output under the unlock condition, while the section e$_3$ is an output under the lock condition. Accordingly, the signal indicated as F in FIG. 7 (the signal at the point F in FIG. 1c) can be obtained by full-wave rectifying such output signal in a full-wave rectifier 26. The signal G in FIG. 7 (signal at the point G in FIG. 1c) can be obtained by reversely encoding such signal into the binary code at the TTL level in a binary encoding circuit 27.

Thus it is apparent that the lock/unlock condition of the Costas Loop demodulating circuit can be judged by monitoring the level of signal G, but this judging method is not perfect. That is, when the reverse spread circuit (FIG. 1a) is not locked, an input of the Costas Loop demodulating circuit becomes almost noise level. As a result, the amplitude of the output signal of the low-pass-filter 15b becomes very small and the signal G becomes H level (section e$_1$). Therefore, judgment does not become perfect if the section e$_1$ is not discriminated.

The device of this embodiment uses the correlation output 1 of the reverse spread circuit for discrimination. The correlation output 1 becomes a large value due to concentration of energy when the reverse spread circuit is locked as described previously. Therefore, when the correlation output 1 is compared with an adequate threshold value in a comparator 29 to encode it into a binary signal, the signal indicated by H in FIG. 7 (the signal at the point H in FIG. 1c) can be obtained. The AND of the signals H and G results in the perfect lock signal. An output waveform of AND gate 28 (the signal at the point I in FIG. 1c) is indicated as I in FIG. 7.

For instance, extraction of such signal is compared here with detection of the conventional lock signal by referring to FIG. 2e. In the conventional systems, the lock signal has been detected using three multipliers in addition to the three multipliers used in the Costas Loop demodulating circuit. Such detection is briefly explained using said symbols.

The input signal $\cos(\omega t + \phi)$ is multiplied with outputs of VCO shifted by +45° or −45° in the respective multipliers, namely cos (ωt+45°), cos (ωt−45°) and following signals can be obtained.

$$\pm A/2[\cos(-45°+\phi)+\cos(2\omega t+45°+\phi)] \quad (3)$$

$$\pm A/2[\cos(+45°+\phi)+\cos(2\omega t-45°+\phi)] \quad (4)$$

These output signals are filtered by the low-pass-filter and are multiplied. Thereby the following signal can be obtained as the lock signal.

$$A^2/4[\cos(0°+2\phi)+\cos 90°] \quad (5)$$

As is obvious from comparison between the embodiment indicated in FIG. 2c and the prior art, the structure of this embodiment is simplified and the present invention also provides an advantage that the reliability for high frequency is high because the 45° phase shifter which has been used in the prior art is no longer employed.

The data demodulated and lock signal detected in the Costas Loop demodulating circuit are applied to the data processing circuit not illustrated.

d. PN code generation

Figure 1D:
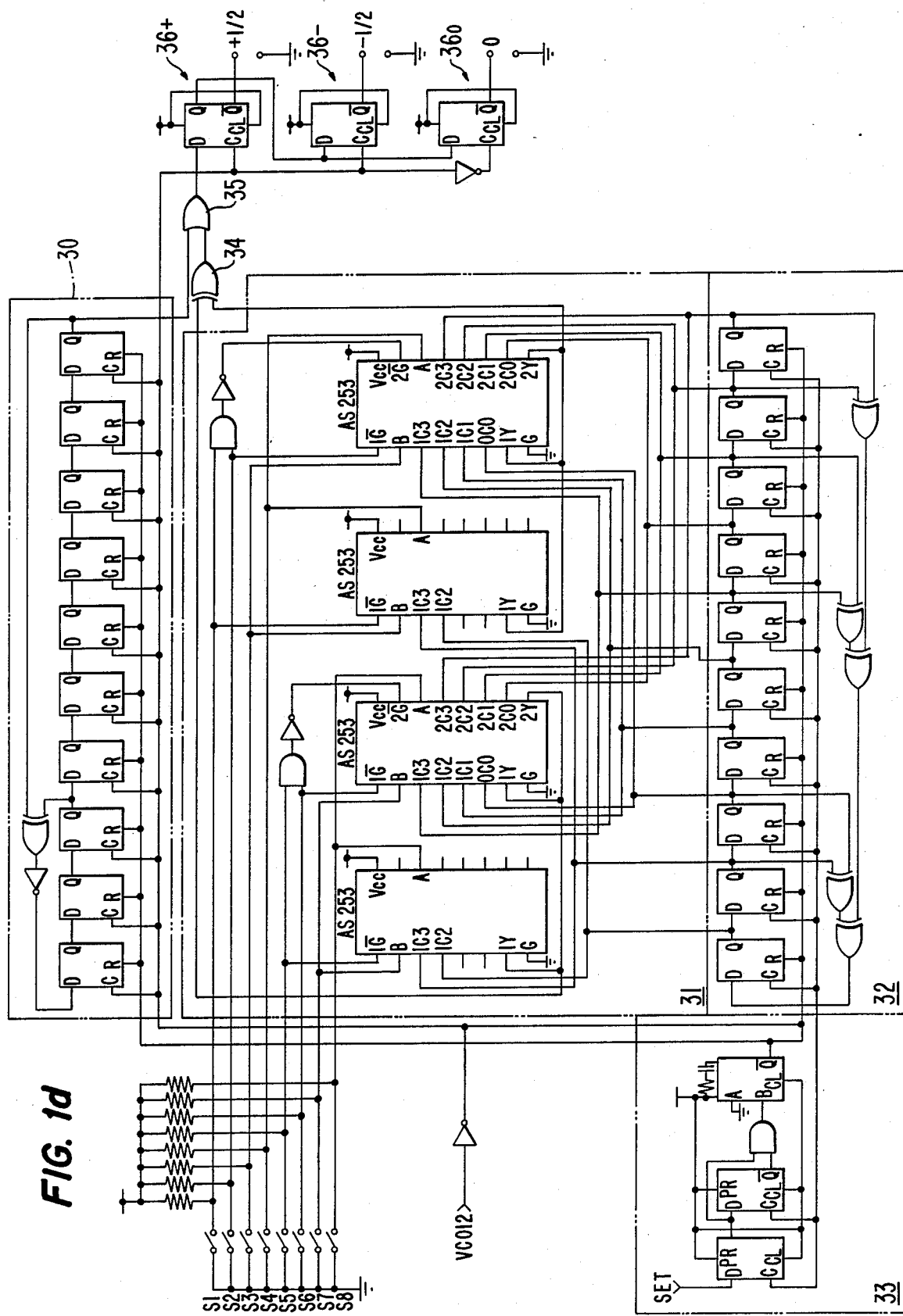
FIG. 1d is a detailed circuit diagram of a PN code generator for use in the receiver of the present invention.

FIG. 1d shows details of the PN code generator 13 of this embodiment. FIG. 2d is a block diagram indicating and outline of the structure of the same circuit. This PN code generator 13 generates the Gold Code train as explained previously. The Gold Code train is generated, briefly speaking, from the sum with a modulus of 2 between the codes of m-series codes of two different code trains (maximal linear codes). The m-series depends on the feedback connection method of the shift register. Therefore, it is impossible to obtain so many kinds of code trains but different Gold Code trains as many as the maximal bits by shifting the base in the sum with the modulus of 2 between the Gold Code trains, that is, m-series code trains of different code trains (becomes equal to this number plus 2 by adding two m-series code trains as the foundation).

Namely, the code train in bit length of 1023 bits is used in this embodiment, but only 10 kinds of code trains at most can be obtained from the feedback connection method in the case of generating the m-series code train with the 10 stages of the shift registers. However, 1023 kinds of Gold Code trains can be obtained by generating the Gold Code train using two different m-series code generator.

The device of this embodiment generates 45 kinds of Gold Code trains assigned to the system among a total of 1023 kinds of Gold Code trains.

With reference to FIG. 1d and FIG. 2d, the first code generator 30 is the m-series code generator feedback connecting the output ends of the 3rd and 10th stages (counted as the 1st, 2nd, 3rd, . . . 10th stage from the left side: adopted in the same way to the successive cases), namely the 3rd tap and 10th tap of the 10-stage shift registers, while the second code generator 32 is the m-series code generator feedback connecting the 2nd tap, 3rd tap, 6th tap, 8th tap, 9th tap and 10th tap of the 10-stage shift registers.

The clock input terminals C of the shift registers forming the first code generator 30 and the second code generator 32 are connected in common to and output end of VCO 12 through an inverter which functions as a buffer, and the clock from VCO 12 is applied thereto. In addition, the reset terminals R are connected in common to an initial set circuit 33, which locks the set signal SET, if it exists, to the clock in order to reset all shift registers.

Since the first code generator 30 and second code generator 32 are formed on the basis of negative logic and as described later, they generate the Gold Codes through inversion by the code shaping portions $36_+$, $36_-$ and $36_0$.

By the way, since the m-series code train is closed in the addition with a modulus of 2, when the m-series allowing phase shift as much as a number of integer bits and the original m-series are added with a modulus of 2, the series including another phase shift of the original m-series can be obtained. A tap selection circuit 31 utilizes this processing.

The tap selection circuit 31 is composed of two pairs of selectors, each of which is respectively formed by two multiplexers (AS253 manufactured by TI Corp. is used in this embodiment) and selects two taps designated from a total of 10 taps of the second code generator 32. Outputs of the taps selected here are combined in the second code combining part, that is, in the exclusive OR gate 34 and thereby the m-series code train including a specified phase shift can be generated.

An output (m-series) of the second code combining part is combined with and output (m-series) of the first code generator 30 in the first code combining part, namely in the exclusive OR gate 35 and thereby the Gold Code train (correctly, inverted Gold Code train) is generated. In this case, since an output of the second code combining part is a little delayed by the gate in the course of circuit, the Gold Code train allows generation of hazard. Therefore, the code shaping is carried out at the code shaping portions $36_+$, $36_-$ and $36_0$.

The code shaping portions $36_+$, $36_-$ and $36_0$ are composed of three D-flipflops. $36_+$ and $36_-$ are connected in series and said equal clock is applied to the respective clock terminals C. Accordingly, an output of $36_-$ generates a phase delay of 1 bit for output of $36_+$. However, $36_0$ is connected in series with $36_+$ but since said clock is inversely applied to the clock terminal thereof, the output of such terminal generates a phase delay of ½ bit for the output of $36_+$. Outputs of these code shaping portions $36_+$, $36_-$ and $36_0$ are extracted from the inverted output terminals of respective D-flipflops (indicated by overline in FIG. 1d).

The tap selection signal which designates the taps for selection of the tap selection circuit 31 is given by the ON and OFF state of the dip switches S1-S8.

Table 1 indicates the relation between the tap selection signal, selected tap and d number of bits to be phase-shifted. However, in this table, switch ON is indicated by "1", switch OFF by "0" and phase shift is indicated as delay for the initial m-series (namely output of the 10th tap of the second code generator 32).

TABLE 1

| No. | S1 | S2 | S3 | S4 | S5 | S6 | S7 | S8 | | |
|---|---|---|---|---|---|---|---|---|---|---|
| 1 | 1 | 1 | 1 | 1 | 1 | 1 | 1 | 0 | 10, 9 | 765 |
| 2 | 1 | 1 | 1 | 1 | 1 | 1 | 0 | 1 | 10, 8 | 507 |
| 3 | 1 | 1 | 1 | 1 | 1 | 1 | 0 | 0 | 10, 7 | 548 |
| 4 | 1 | 1 | 1 | 1 | 1 | 0 | 1 | 1 | 10, 6 | 1014 |
| 5 | 1 | 1 | 1 | 1 | 1 | 0 | 1 | 0 | 10, 5 | 160 |
| 6 | 1 | 1 | 1 | 1 | 1 | 0 | 0 | 1 | 10, 4 | 73 |
| 7 | 1 | 1 | 1 | 1 | 1 | 0 | 0 | 0 | 10, 3 | 882 |
| 8 | 1 | 1 | 1 | 1 | 0 | 1 | 1 | 1 | 10, 2 | 1005 |
| 9 | 1 | 1 | 1 | 1 | 0 | 1 | 1 | 0 | 10, 1 | 13 |
| 10 | 1 | 1 | 1 | 0 | 1 | 1 | 0 | 1 | 9, 8 | 766 |
| 11 | 1 | 1 | 1 | 0 | 1 | 1 | 0 | 0 | 9, 7 | 508 |
| 12 | 1 | 1 | 1 | 0 | 1 | 0 | 1 | 1 | 9, 6 | 549 |
| 13 | 1 | 1 | 1 | 0 | 1 | 0 | 1 | 0 | 9, 5 | 1015 |
| 14 | 1 | 1 | 1 | 0 | 1 | 0 | 0 | 1 | 9, 4 | 151 |
| 15 | 1 | 1 | 1 | 0 | 1 | 0 | 0 | 0 | 9, 3 | 74 |
| 16 | 1 | 1 | 1 | 0 | 0 | 1 | 1 | 1 | 9, 2 | 883 |
| 17 | 1 | 1 | 1 | 0 | 0 | 1 | 1 | 0 | 9, 1 | 1006 |
| 18 | 1 | 1 | 0 | 1 | 1 | 1 | 0 | 1 | 8, 7 | 767 |
| 19 | 1 | 1 | 0 | 1 | 1 | 0 | 1 | 0 | 8, 6 | 499 |
| 20 | 1 | 1 | 0 | 1 | 1 | 0 | 1 | 1 | 8, 5 | 553 |
| 21 | 1 | 1 | 0 | 1 | 1 | 0 | 0 | 0 | 8, 4 | 1016 |
| 22 | 1 | 1 | 0 | 1 | 1 | 0 | 0 | 1 | 8, 3 | 162 |
| 23 | 1 | 1 | 0 | 1 | 0 | 1 | 1 | 0 | 8, 2 | 75 |
| 24 | 1 | 1 | 0 | 1 | 0 | 1 | 1 | 1 | 8, 1 | 884 |
| 25 | 1 | 1 | 0 | 0 | 1 | 0 | 1 | 1 | 7, 6 | 768 |
| 26 | 1 | 1 | 0 | 0 | 1 | 0 | 1 | 0 | 7, 5 | 510 |
| 27 | 1 | 1 | 0 | 0 | 1 | 0 | 0 | 1 | 7, 4 | 551 |
| 28 | 1 | 1 | 0 | 0 | 1 | 0 | 0 | 0 | 7, 3 | 1017 |
| 29 | 1 | 1 | 0 | 0 | 0 | 1 | 1 | 1 | 7, 2 | 163 |
| 30 | 1 | 1 | 0 | 0 | 0 | 1 | 1 | 0 | 7, 1 | 76 |
| 31 | 1 | 0 | 1 | 1 | 1 | 0 | 1 | 0 | 6, 5 | 769 |
| 32 | 1 | 0 | 1 | 1 | 1 | 0 | 0 | 1 | 6, 4 | 511 |
| 33 | 1 | 0 | 1 | 1 | 1 | 0 | 0 | 0 | 6, 3 | 552 |
| 34 | 1 | 0 | 1 | 1 | 0 | 1 | 1 | 1 | 6, 2 | 1018 |
| 35 | 1 | 0 | 1 | 1 | 0 | 1 | 1 | 0 | 6, 1 | 154 |
| 36 | 1 | 0 | 1 | 0 | 1 | 0 | 0 | 1 | 5, 4 | 770 |
| 37 | 1 | 0 | 1 | 0 | 1 | 0 | 0 | 0 | 5, 3 | 512 |
| 38 | 1 | 0 | 1 | 0 | 0 | 1 | 1 | 1 | 5, 2 | 553 |
| 39 | 1 | 0 | 1 | 0 | 0 | 1 | 1 | 0 | 5, 1 | 1019 |
| 40 | 1 | 0 | 0 | 1 | 1 | 0 | 0 | 0 | 4, 3 | 771 |
| 41 | 1 | 0 | 0 | 1 | 0 | 1 | 1 | 1 | 4, 2 | 513 |
| 42 | 1 | 0 | 0 | 1 | 0 | 1 | 1 | 0 | 4, 1 | 554 |
| 43 | 1 | 0 | 0 | 0 | 0 | 1 | 1 | 1 | 3, 2 | 762 |
| 44 | 1 | 0 | 0 | 0 | 0 | 1 | 1 | 0 | 3, 1 | 514 |
| 45 | 0 | 1 | 1 | 1 | 0 | 1 | 1 | 0 | 2, 1 | 773 |

If the Gold Code generator of the present invention is compared with the conventional Gold Code generator of, the prior art shown in FIG. 2f, although the prior art structure of it seems to be simple, requires a large number of elements and signal lines in comparison with the present invention because the phase shifts of the first code generator and second code generator are respectively given as the first start position data and second start position data. The prior art can be considered equivalent to setting/resetting one by one each shift register of the first code generator 30 and second code generator 32 of the device of the present invention indicated in FIG. 1d. That is, since each element forming each shift register requires and initial set circuit, the number of the elements and signal lines of PN code generating circuit is greatly increased.

e. Operations

FIG. 8, FIG. 9, FIG. 10, FIG. 11, FIG. 12 and FIG. 13 are flowcharts which indicate an outline of the operations of CPU 10 in the device of the present invention. Operations of CPU 10 will be explained hereunder with reference to these drawings.

First, the main symbols are explained. F1 is a flag which indicates completion of and initial seizure operation. F2 is a flag which indicates completion of a phase lock operation and F3 is a flag which indicates an increment of the frequency multiplication or division rate in the Doppler compensation operation.

CN is a counter for measuring the asynchronization period.

G is a register for storing data corresponding to a voltage level, N is a register for storing data corresponding to a Doppler compensation value, Y is a register for storing data corresponding to a control voltage of VCO 12.

Figure 8:
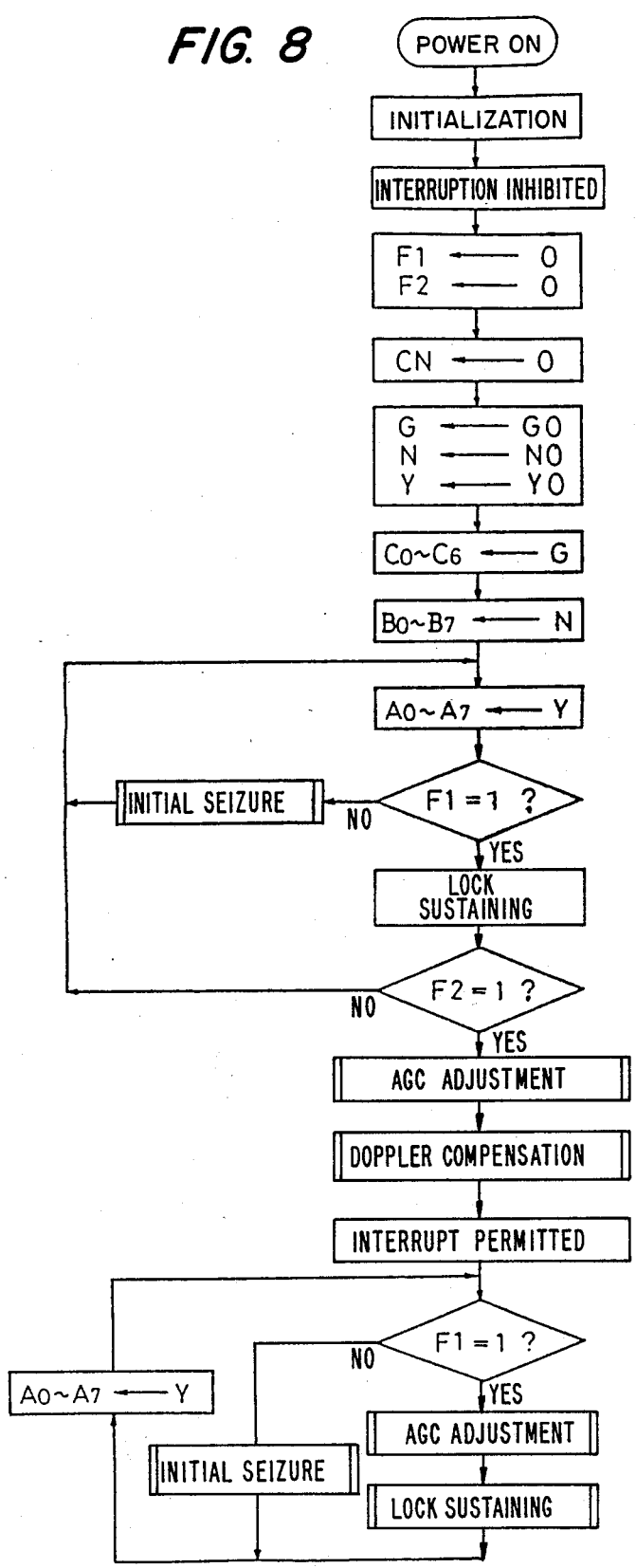

With reference to FIG. 8, when the power switch is turned ON, respective memories, registers and input-/output ports are initialized and inhibits interruption.

Next, the flags F1 and F2 are reset (0), the counter CN is cleared (0), the initial values G0, N0, Yo are loaded to the registers G, N and Y respectively. An output is sent to the D/A converter 11b from the output ports $C_0 \sim C_6$. The (1/N) multiplier 119 of synthesizer SYN indicated in FIG. 2a from the output ports $B_0 \sim B_7$. The D/A converter 11a receives an output from the output ports $A_0 \sim A_7$. These initial values, namely G0 is a value corresponding to the center value of the part where the graph of FIG. 6b reduces linearly while N0 is a value to set the multiplication coefficient of the (1/N) multiplier 119 of the synthesizer SYN indicated in FIG. 2a to 1/2800, and Y0 is a value to set the oscillation frequency of VCO 12 indicated in FIG. 1a to 1.024 MHz.

Since the oscillation frequency of VCO 12 is set to 1.024 MHz and one bit is deviated in one frame for the code train included in the receiving signal, as explained previously, while such deviation makes a circulation (while deviation is extended up to 1023 bits), the peak of correlation indicated in waveform A FIG. 3a appears in the correlation output 1 indicated in FIG. 1a. Therefore, such peak can be detected by repeating the initial seizure operation in the loop processing.

Figure 9:
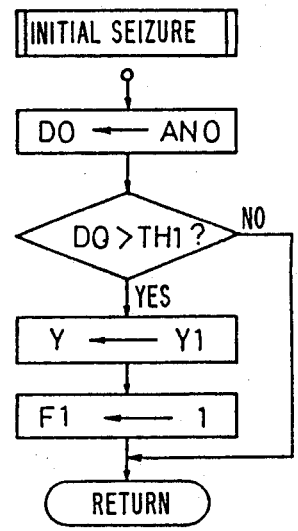
Figure 11:
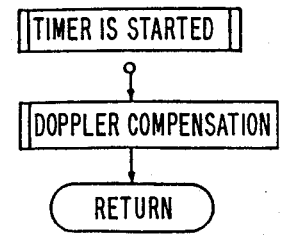

The initial seizure operation is explained with reference to FIG. 9. In this case, the input of analog port AN0, namely, the correlation output 1 indicated in FIG. 1a is read and it is then loaded to the register D0. The value of this register D0 is compared with the threshold value TH1. If it is less than TH1, operation returns. If it exceeds TH1, the value Y1 which sets the oscillation frequency of VCO 12 to 1.023 MHz is loaded to the register Y, then the flag F1 is set (1) and operation returns. When the main routine returns, a value of this register Y is immediately output to the D/A converter 11a from the output ports $A_0$-$A_7$. Therefore, the oscillation frequency of VCO 12 becomes 1.023 MHz and temporary phase locking is completed.

Since the flag F1 which indicates completion is set in the initial seizing operation, the phase lock sustaining operation is executed in a similar loop operation.

Figure 10:
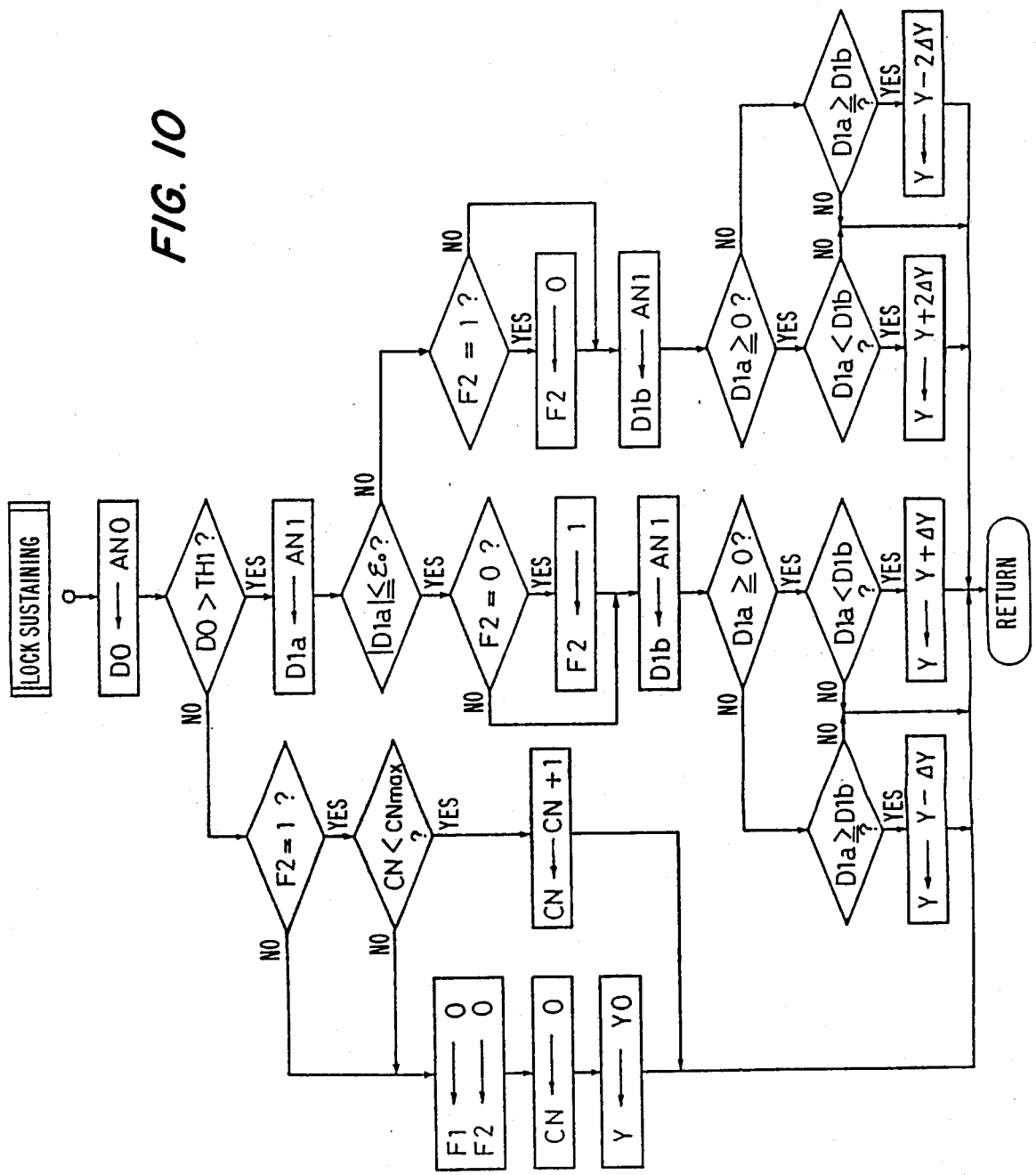

The phase lock sustaining operation is explained with reference to FIG. 10. The process until the completion of phase lock will be explained and explanation for asynchronization will be made later.

An input of analog port AN0 is read again and it is compared with the threshold value TH1. This comparison is made for checking whether the temporary phase lock is unlocked or not.

Under the temporary phase lock condition, an input to the analog port AN1, namely a correlation output 2 indicated in FIG. 1a has a level between $a_1$ and $a_2$ of the waveform D indicated in FIG. 3a. First, as indicated in FIG. 3b, it is considered that the signal level is outside of the range of $\pm\epsilon_0$ (value in the vicinity of 0) (actually, the correlation output 2 under the phase lock or temporary phase lock condition does not show the waveform D indicated in FIG. 3a or FIG. 3b, but this waveform is used for the convenience of explanation).

An input of AN1 is read during a time interval and a value read formerly is loaded to the register D1a while a value read subsequently loaded to the register D1b respectively.

When a value of register D1a is positive, namely it corresponds to point a indicated in FIG. 3ba, if a value read subsequently, namely a value of register D1b is smaller, it means the phase is locked. Therefore operation returns from this point. If a value read subsequently, namely a value of register D1b is larger, it means that the phase slides toward asynchronization. Therefore, a value of register Y is increased only by $2\Delta Y$ and operation returns from this point. Since a value of register Y is output to the D/A converter 11a from the output ports $A_0 \sim A_7$, the oscillation frequency of VCO 12 is increased a little. This process is explained by referring to the waveform of FIG. 3b. That is, when the oscillation frequency of VCO 12 is increased a little, this waveform shifts to the left and therefore an input of AN1 is lowered.

When a value of register D1a is negative, namely when it corresponds to the point b in FIG. 3b, if a value read subsequently, namely a value of register D1b is larger, it means that phase is locked, therefore operation returns from this point. In this case, a value read subsequently, namely a value of register D1b is smaller, it means that the phase slides toward asynchronization. Therefore, a value of register Y is lowered only by $2\Delta Y$ and operation returns from this point. Since a value of register Y is output to the D/A converter 11a from the output ports $A_0 \sim A_7$, the oscillation frequency of VCO 12 is lowered a little. This process is explained by referring to the waveform of FIG. 3b. When the oscillation frequency of VCO 12 is lowered, this waveform shifts to the right. Accordingly, an input of AN1 is increased.

Such operations are repeated by the loop processing and thereby the phase is locked. When an input to AN1 is set within the range of $\pm\epsilon_0$, the flag F2 is set (1). Thereafter, the step for renewing the oscillation frequency of VCO 12 becomes $\Delta Y$ and others are the same as explained above. Explanation about them is therefore omitted here.

When the flag F2 is set and operation returns to the main routine, the AGC adjustment processing is carried out.

Figure 13:
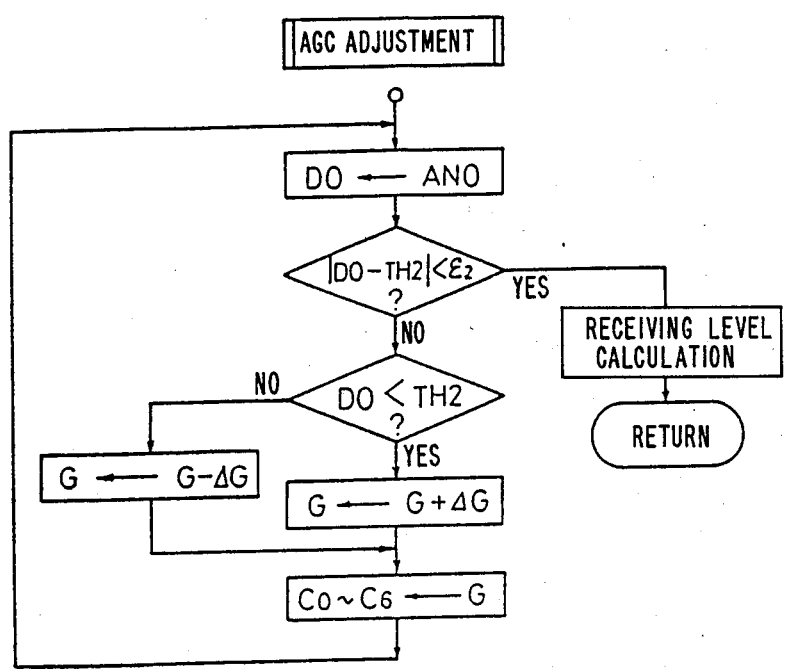

The AGC adjustment processing is explained with reference to FIG. 13. First, an input of analog port AN0, namely the level of correlation output 1 is read and it is then loaded to the register D0. When a value of D0 is in the outside of the range of $\pm\epsilon_2$ of the specified threshold value TH2 (a value in the vicinity), the AGC voltage is changed.

Namely, when a value of D0 is smaller than TH2, it means and attenuation coefficient of AGC amplifier 111 (FIG. 2a) is too large. Therefore, a value of register G is renewed by increasing it only by $\Delta G$ to raise the AGC voltage. When a value of D0 is larger than TH2, it means and attenuation coefficient of AGC amplifier 111 is too small. Therefore, a value of register G is renewed by lowering it only by $\Delta G$ to drop the AGC voltage.

The above processing is repeated in the form of loop and when a value of D0 becomes equal to a value in the vicinity of the specified threshold value TH2 (in the range of $\pm\epsilon_2$), operations returns to the main routine after calculation a receiving level (described later).

In the main routine, the Doppler compensation processing is executed. The correlation output 1 when phase is locked or locked temporarily is different from the waveform indicated in FIG. 4. But it is used for the convenience of explanation. When the sending frequency is deviated from the preset value due to the Doppler effect, etc., the correlation output 1 is located at the position indicated by FIG. 4c or d and it is lower than the value which should be obtained naturally, namely the peak value. Therefore, it is compensated by renewing the second local oscillation signal, that is, the oscillation frequency of the synthesizer SYN. This is called the Doppler compensation processing or operation.

Figure 12:
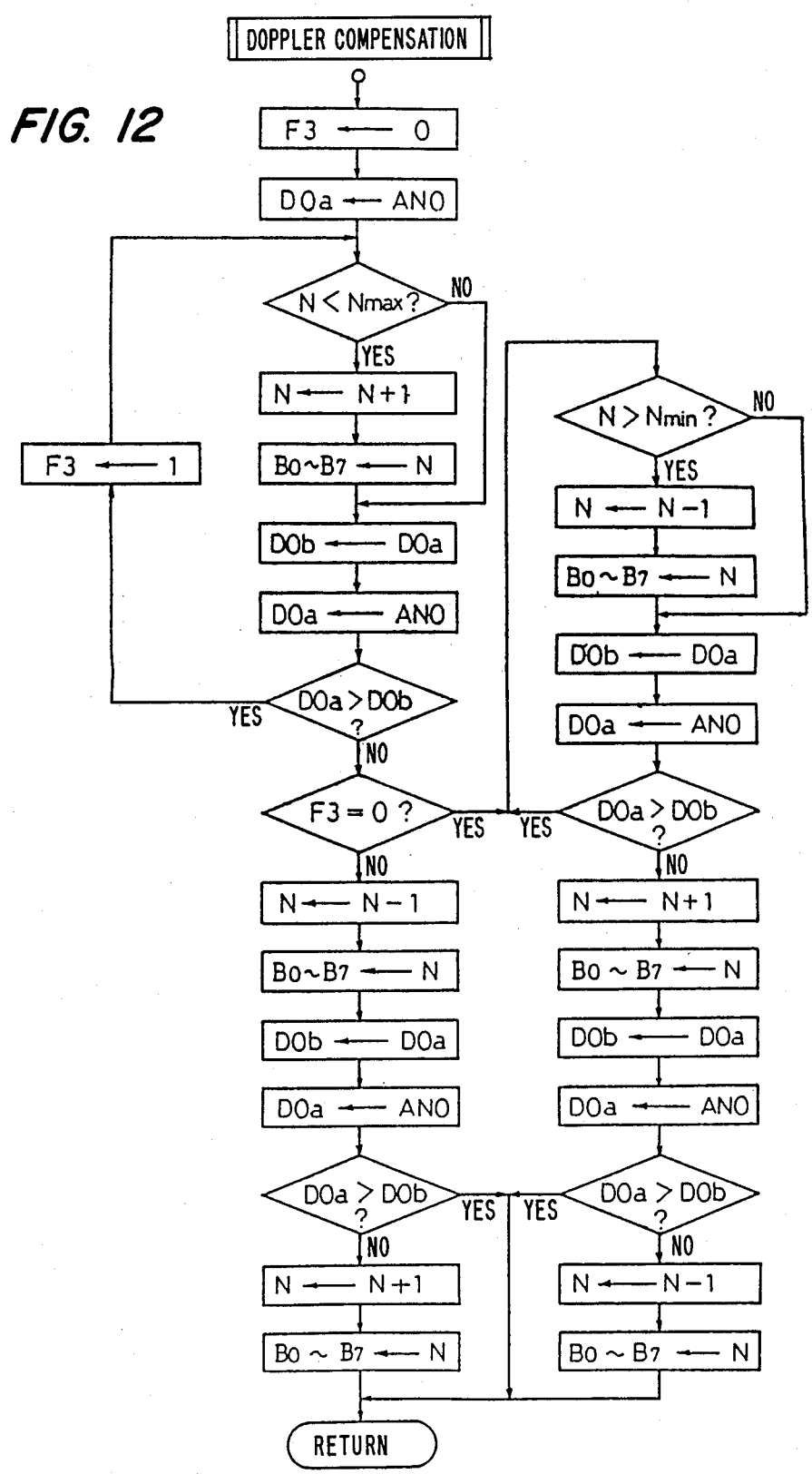

This Doppler compensation processing is explained hereunder by referring to FIG. 12. First, the flag F3 is cleared, an input of analog port AN0, namely the level of correlation output 1 is read and it is then loaded to the register D0a.

When a value of register N is under $N_{max}$, namely 2850, a value of N is output after being incremented by 1. Thereafter, a value of register D0a is pushed to the register D0b, an input of analog port AN0 is read and then it is loaded to the register D0a. A value of register D0a, in this case, is the level of the correlation output 1 after the renewal, while a value of register D0b is the level before the renewal. Therefore, the increase/decrease of level by such renewal can be judged by comparing both values.

In case the level is increased, the flag F3 is set (1) and above operations are repeated. When the level of the correlation output 1 is reduced exceeding the peak by such repetition, a value of register D0a becomes smaller than the value of register D0b. In this case, since the flag F3 is being set, a value of register N is output after being decremented by 1, the increase/decrease of the level of the correlation output 1 by such renewal is judged as explained above. In case the level is increased, it is judged as the optimum value and operation returns from this point. In case the level is decreased, it is judged that the optimum value has been the value before this renewal and a value of register N is reset to the preceding value and it is then output and operation returns to the main routine.

At the beginning, in case the level of correlation output 1 is decreased when a value of register N is output after increment of 1, since the flag F3 is being reset (0), the loop processing for searching the optimum value of register N is executed while sequentially decrementing of the value of register N. This operation is not explained here because it becomes a repetion of above explanation.

Since the device of this embodiment has completed the initialization, the main routine allows interruption and sets the permanent operation loop. In this loop, said AGC adjustment processing and phase lock processing are executed repeatedly, the initial seizing processing operation is executed for asynchronization, if it occurs, and the Doppler compensation processing is executed when the interrupt request in the specified period is issued on the basis of the internal timer. (Refer to FIG. 11.)

The asynchronization process is then explained by returning to FIG. 10.

Here, it is considered that after phase lock is completed, an input of AN0, namely the correlation output 1 is decreased.

In case it is gradually decreased, it is reverse case to said phase lock. Namely, an input of AN1 (correlation output 2) is asynchronized first from a value in the vicinity of 0. Therefore, the flag F2 is reset. When an input of AN0 is further lowered less than the threshold value TH1, the flag F1 is reset because the flag F2 is already reset, Y0 (initial value: corresponding to 1.024 MHz) is set to the register Y and operation returns. When operation returns to the main routine, a value of register Y is first output in order to renew the oscillation frequency of VCO 12. Thereafter, the initial seizing processing is executed by the loop processing since the flag F1 is set. The successive operations are the same as those explained above.

For instance, if the antenna is temporarily shielded (such condition is often supposed when a vehicle carrying the device of the present invention passes between buildings or through a tunnel), the correlation output 1 is suddenly decreased less than the threshold level TH1. In this case, since the flag F2 is being set, a counter CN starts measurement of time. When phase lock is recovered before the value of counter CN exceeds the specified value $CN_{max}$, operation returns to the loop processing for sustaining the phase lock condition. If the phase lock is recovered after the value of counter CN exceeds the specified value $CN_{max}$, the flags F1, F2, counter CN and register Y are initialized and the initial seizing operation is executed. Successive operations are the same as those explained above.

The phase lock condition is generally not broken excessively even in the case where the antenna is temporarily shielded. Therefore, even if asynchronization occurs within a short period of time, communication can often be started immediately after the phase lock condition is recovered by keeping said asynchronized condition. Namely, asynchronization for a short period of time prevents the condition that communication is often suspended by respective initial seizing processings.

Finally, processing for calculation of a receiving level, which has been omitted in the explanation about AGC adjustment processing, is explained hereunder.

In this embodiment, since a circular polarized wave microstrip antenna is used as the receiving antenna Ant, for instance, in case the mobile communication is to be carried out by loading this device into the vehicles, if the antenna Ant is fixed to the roof of vehicles, an output level of antenna Ant varies depending on the attitude (direction) of vehicles without relation to the field intensity of the receiving point because the circular polarized wave microstrip antenna has the directivity. Since an output of this antenna Ant is fixed to a constant value through the AGC adjustment, accurate evaluation for communication condition becomes impossible and reliability of communication is thereby lowered. Therefore, in the receiving level calculation processing, the field intensity at the receiving point is calculated by compensating for the level of correlation output 1 with the radiation pattern of receiving antenna Ant and reverse compensation for AGC.

Here, since evaluation of signals having no correlation is useless in the SS communication, the level of correlation output 1 after AGC adjustment is used.

It is requested here to refer to FIG. 13 again.

FIG. 5a indicates an example a radiation pattern of the receiving antenna Ant. Although the pattern differs depending on the installation condition of receiving antenna Ant, in the case of this embodiment, communication is carried out between the device under the operating condition and an adequate transmitter corresponding thereto, the relative positional relation between said transmitter and the receiving antenna Ant is sequentially changed, the receiving levels obtained sequentially (while the adjustment value of AGC is fixed to a constant value) are arranged adequately as the relative data, a table as indicated in FIG. 5b is generated through correspondence between such data and the positional data, namely the azimuth data (Az) and elevation data (E) of transmitter viewed from the receiving antenna Ant and such table is stored in the internal ROM of CPU 10.

In the system utilizing the device of this embodiment, since the positional information of sending side is included in the sent data, the compensation value is read by making reference to the ROM table. Since the attenuation amount in the AGC amplifier 111 changes linearly (refer to FIG. 6b), it can be obtained directly from a value of register G. Therefore, the field intensity of the receiving point (relative value) can be calculated by executing compensation by radiation pattern and reverse compensation of AGC to an input of AN0, namely to the correlation output 1 being stored in the register D0.

The field intensity data of the receiving point obtained by such receiving level calculation processing is output to the display processing device not illustrated from the serial output port E0.

Operations of CPU 10 are explained above and the characteristic operations of this embodiment are listed hereunder.

(1) If the phase lock condition is destroyed for a very short period of time, such condition (oscillation frequency of VCO 12) is maintained. Therefore, communication can be recovered immediately after operating condition is recovered to normal condition.

(2) Since frequency deviation of the second local oscillator is compensated from time to time by monitoring the receiving level, good compensation can be realized even for the receiving signal not including the carrier element.

(3) Since AGC adjustment is carried out by monitoring the receiving level, fine adjustment is possible.

(4) Field intensity at the receiving point can be calculated by compensating for the receiving level with the antenna gain and AGC gain. Namely, communication condition can be evaluated correctly by detecting the accurate condition of the receiving point.

As explained above, the present invention detects the lock condition of a Costas Loop demodulating circuit, when the reverse spread circuit is locked, in case the signal multiplying the demodulated signal of which the phase is shifted by 90° and the reverse spread signal and therefore assures very simplified circuit structure because the ±45° phase shifters and additional amplifiers which have been required for the prior art are no longer necessary. Moreover, since the detected levels are compared with each other without relation to frequency, the device can be formed with very economical parts.

What is claimed is:

1. A receiver for use in an spread spectrum communication system comprising:

receiving means for receiving spread spectrum signals, spread signal distributing means for distributing a spread spectrum signal received by said receiving means into a first spread signal, a second spread signal and a third spread signal, pseudo noise signal generating means for generating a first pseudo noise signal having a code series substantially the same as a code series of a pseudo noise signal included in said received spread spectrum signal and having a reference phase, a second pseudo noise signal having a phase that leads the reference phase by an amount corresponding to a specified number of bits and a third pseudo noise signal having a phase that lags the reference phase by an amount corresponding to a specified number of bits, activating means for setting a bit rate of said pseudo noise signal generating means, first correlation detecting means for reversely spreading said first spread signal and for detecting the correlation with said first pseudo noise signal, second correlation detecting means for reversely spreading said second spread signal and for detecting the correlation with said second pseudo noise signal, third correlation detecting means for reversely spreading said third spread signal and for detecting the correlation with said third pseudo noise signal, hybrid means for generating a signal depending on a difference between an output of said second correlation detecting means and an output of said third correlation detecting means, initial seizing control means for setting a first bit rate to said activating means and synchronizing the pseudo noise signal included in said received spread spectrum signal and said first pseudo noise signal by monitoring an output of said first correlation detecting means, phase lock sustaining control means for setting a second bit rate to said activating means and sustaining synchronization between the pseudo noise signal included in said received spread spectrum signal and said first noise signal by monitoring an output of said first correlation detecting means and an output of said hybrid means, synchronization control means for first operating the initial seizing control means and upon completion of the operation of said initial seizing control means, starting a measurement of time by suspending execution of a synchronization sustaining control operation which is performed by a synchronization sustaining control means when an output of said first correlation detecting means becomes lower than a specified level and executing the synchronization sustaining control operation if an output of said first correlation detecting means becomes higher than said specified level within a specified time period, and demodulating means connected to said first correlation detecting means for extracting data included in said received spread spectrum signal.

2. A receiver for use in a spread spectrum communication system according to claim 1, wherein said initial seizing control means causes said initial seizing control operation to start when an output of said first correlation detecting means becomes lower than said specified level and remains lower than the specified level for a period of time exceeding a specified time period during operation of said synchronization sustaining control means.

3. A receiver for use in a spread spectrum communication system according to claim 2, wherein said synchronization control means suspends operation of said synchronization sustaining control means and starts a measurement of time when an output of said first correlation detecting means becomes lower than said specified level after said synchronization sustaining control means controls an output of said hybrid means to be within a specified range in the vicinity of the reference level and causes the synchronization sustaining control means to start operation again when a time measuring means of said first correlation detecting means becomes higher than said specified level within the specified time period.

4. A receiver for use in a spread spectrum communication system according to claim 3, wherein said synchronization control means stops operation of said synchronization sustaining control means and causes said initial seizing control means to start operating when an output of said first correlation detecting means becomes lower than said specified level before said synchronization sustaining control means controls an output of said hybrid means within said specified range in the vicinity of the reference level.

5. A receiver for use in a spread spectrum communication system according to claim 1, wherein said receiving means comprises:
 oscillator means for oscillating electrical signals of a preset frequency,
 frequency mixing means for mixing said received spread spectrum signal and an electrical signal oscillated by said oscillator means to produce a spread spectrum signal of low frequency, and
 frequency compensation control means for controlling an output of said first correlation detecting means by adjusting the frequency of said electrical signal from time to time.

6. A receiver for use in a spread spectrum communication system according to claim 5, wherein said frequency mixing means further comprises:
 level adjustment control means for controlling an output of said first correlation detecting means to a preset level,
 frequency compensation control means for controlling an output of said first correlation detecting means by adjusting the frequency of said electrical signal from time to time, and
 wherein said synchronization control means causes said synchronization sustaining control means, said level adjustment control means and said frequency compensation control means to start operating after said initial seizing control means has initially seized control.

7. A receiver for use in a spread spectrum communication system according to claim 6, wherein said synchronization control means adjusts a gain of said level adjustment control means to a constant value during operation of said frequency compensation control means.

8. A receiver for use in a spread spectrum communication system according to claim 1, wherein said demodulating means comprises:
 Costas Loop demodulating means,
 first prelock detecting means for detecting a first prelock signal when an output of said first correlation detecting means exceeds a preset level,
 second prelock detecting means for detecting a second prelock signal when an amplitude of an output of a second multiplying means of said Costas Loop demodulating means is within a preset range, and
 lock detecting means which detects a lock condition of said Costas Loop demodulating means when said first prelock signal and said second prelock signal are present.

9. A receiver for use in a spread spectrum communication system according to claim 8, wherein said Costas Loop demodulating means comprises,
 oscillator means for oscillating a first demodulating signal,
 phase shift means for generating a second demodulating signal of which the phase is shifted by 90° from said first demodulating signal,
 first multiplying means for multiplying a first reverse spread signal generated from a first reverse spread of said first correlation detecting means and said first demodulating signal,
 second multiplying means for multiplying said first reverse spread signal and the second demodulating signal,
 third multiplying means for multiplying an output of said first multiplying means and an output of said second multiplying means, and
 frequency control means for controlling the oscillation frequency of said oscillator means in accordance with a mean value of an output of said third multiplying means.

10. A receiver for use in a spread spectrum communication system according to claim 9, wherein said first prelock detecting means comprises a binary encoding means, said second prelock detecting means comprises full-wave rectifying means and a binary encoding means, and said lock detecting means comprises a logic gate.

11. A receiver for use in a spread spectrum communication system comprising:
 spread signal distributing means for distributing a received spread spectrum signal into at least three signals comprising a first spread signal, a second spread signal and a third spread signal,
 pseudo noise signal generating means which generates pseudo noise signals having a code series which is substantially equal to a pseudo noise signal included in said received spread spectrum signal,
 phase shift means for receiving a pseudo noise signal generated by said pseudo noise signal generating means for outputting at least a first pseudo noise signal having a reference phase, a second pseudo noise signal having a phase which leads the reference phase of said first pseudo noise signal by an amount corresponding to a specified number of code bits and a third pseudo noise signal having a phase which lags the reference phase of said first pseudo noise signal by an amount corresponding to a specified number of code bits,
 first correlation detecting means comprising first reverse spread means for generating a first reverse spread signal by reversely spreading said first reverse spread signal with said first pseudo noise signal, first signal extracting means for extracting a signal element of said first reverse spread signal, and first detecting means for detecting by an envelope detection method an extracted signal element of said first signal extracting means, second correlation detecting means comprising second reverse spread means for generating a second reverse spread signal by reversely spreading said second spread signal with said second pseudo noise signal, second signal extracting means for extracting a signal element of said second reverse spread signal, and second detecting means for detecting by an envelope detecting method an extracted signal element of said second signal extracting means, third correlation detecting means comprising third reverse spread means for generating a third reverse spread signal by reversely spreading said third spread signal with said third pseudo noise signal, third signal extracting means for extracting a signal element of said third reverse spread signal and third detecting means for detecting by an envelope detection method an extracted signal element of said third signal extracting means, hybrid means for generating a signal corresponding to a difference between an output of said second correlation detecting means and an output of said third correlation detecting means, synchronization control means for setting a bit rate which deviates by a specified value from the bit rate of the pseudo noise signal included in said received spread spectrum signal and for executing an initial seizing control operation to adjust the bit rate to be substantially equal to the bit rate of the pseudo noise signal included in said received spread spectrum signal when an output of said first correlation detecting means becomes higher than the specified level, and for continuously executing a synchronization sustaining control operation to hold an output of said hybrid means to a reference level after the bit rate is adjusted in said initial seizing control operation by monitoring an output of said first correlation detecting means and an output of said hybrid means and adjusting the bit rates from time to time, and for suspending execution of said synchronization sustaining control operation to start a measurement of time when an output of said first correlation detecting means becomes lower than said specified level during execution of said synchronization sustaining control operation and for re-executing the synchronization sustaining control operation when an output of said first correlation detecting means becomes higher than said specified level within a specified time period, and activating means for activating said pseudo noise generating means on the basis of the bit rate set by said synchronization control means.

12. A receiver for use in a spread spectrum communication system according to claim 11, wherein said synchronization control means executes said initial seizing control operation when an output of said first correlation detecting means becomes lower than said specified level during execution of said synchronization sustaining control operation and such condition continues for a period of time exceeding the specified time period.

13. A receiver for use in a spread spectrum communication system according to claim 12, wherein said synchronization control means suspends execution of said synchronization sustaining control operation and starts a measurement of time when an output of said first correlation detecting means becomes lower than said specified level after an output level of said hybrid means is controlled to be within a specified range in the vicinity of said reference level of said synchronization sustaining control means for executing the synchronization sustaining control operation when an output of a measuring means of the first correlation detecting means becomes higher than said specified level within the specified time period.

14. A receiver for use in spread spectrum communication system according to claim 13, wherein said synchronization control means suspends execution of the synchronization sustaining control operation and executes said initial seizing control operation when an output of first correlation detecting means becomes lower than said specified level before an output of said hybrid means is controlled to be within said specified level in the vicinity of said reference level in said synchronization sustaining control means.

15. A receiver for use in spread spectrum communication system comprising:

oscillator means for oscillating an electrical signal of a preset frequency, frequency mixing means for mixing the received spread spectrum signal and an electrical signal oscillated by said oscillator means to generate a spread spectrum signal of low frequency, spread signal distributing means for distributing the spread spectrum signal output from said frequency mixing means into at least a first spread signal, a second spread signal and a third spread signal, pseudo noise signal generating means for generating a pseudo noise signal having a code train which is substantially equal to a pseudo noise signal included in said received spread spectrum signal, phase shift means for receiving the pseudo noise signal generated from said pseudo noise signal generating means and for outputting at least a first pseudo noise signal having a reference phase, a second pseudo noise signal having a phase which leads the reference phase of said first pseudo noise signal by an amount corresponding to a specified number of code bits and a third pseudo noise signal having a phase which lags the reference phase of said first pseudo noise signal by an amount corresponding to a specified number of code bits, first correlation detecting means comprising first reverse spread means for generating a first reverse spread signal by reversely spreading said first spread signal with said first pseudo noise signal, first signal extracting means for extracting a signal element of said first reverse spread signal, and first detecting means for detecting an extracted signal element of said first signal extracting means by an envelope detecting method, second correlation detecting means comprising a second reverse spread means for generating a second reverse spread signal by reversely spreading said second spread signal with said second pseudo noise signal, a second signal extracting means for extracting a signal element of said second reverse spread signal and second detecting means for detecting an extracted signal element of said second signal extracting means by an envelope detecting method, third correlation detecting means comprising a third reverse spread means for generating a third reverse spread signal by reversely spreading said third spread signal with said third pseudo noise signal, third extracting means for extracting a signal element of said third reverse spread signal and third detecting means for detecting an extracted signal element of said third extracting means by an envelope detecting method, hybrid means for generating a signal depending on a difference between an output of said second correlation detecting means and an output of said third correlation detecting means, synchronization control means for setting a bit rate which deviates by a specified value from the bit rate of the pseudo noise signal included in said received spread spectrum signal, and for executing an initial seizing control operation to adjust the bit rate to be substantially equal to the bit rate of the pseudo noise signal included in said received spread spectrum signal when an output of said first correlation detecting means becomes higher than a specified level, and for continuously executing, after the bit rate is adjusted in said initial seizing control operation, a synchronization sustaining control operation to hold an output of said hybrid means to a reference level and for causing a frequency compensation control means to control an output of said correlation detecting means by adjusting the frequency of said electrical signal from time to time by monitoring an output of said first correlation detecting means and an output of said hybrid means and adjusting the bit rates from time to time, activating means for activating said pseudo noise generating means on the basis of the bit rate set by said synchronization control means, and demodulating means connected to said synchronization control means for extracting data included in said spread spectrum signal.

16. A receiver for use in a spread spectrum communication system according to claim 15, wherein said frequency mixing means further comprises level adjusting means, said synchronization control means further controls said level adjusting means and continuously executes, after the bit rate is adjusted in said initial seizing control operation, the synchronization sustaining control operation to control an output of said hybrid means to be substantially at the reference level by adjusting the bit rates from time to time, and further controlling the level adjusting means to control an output of said first correlation detecting means to a preset level by adjusting the gain of said level adjusting means and controlling the frequency compensation control mean to control an output of the first correlation detecting means to be a maximum by adjusting the frequency of said electrical signal from time to time, by monitoring an output of said first correlation detecting means and an output of said hybrid means.

17. A receiver for use in a spread spectrum communication system according to claim 16, wherein said synchronization control means adjusts the gain of the level adjusting means to a constant value during said frequency compensation control operation.

18. A receiver for use in a spread spectrum communication comprising:

spread signal distributing mean for distributing a received spread spectrum signal into at least a first spread signal, a second spread signal and a third spread signal, pseudo noise signal generating means for generating a pseudo noise signal having a code series which is substantially equal to a pseudo noise signal included in said received spread spectrum signal, phase shift means for receiving the pseudo noise signal generated from said pseudo noise signal generating means and for outputting at least a first pseudo noise signal having a reference phase, a second pseudo noise signal having a phase which leads the reference of the first pseudo noise signal by an amount corresponding to a specified number of code bits and a third pseudo noise signal having a phase which lags the reference phase of the first pseudo noise signal by an amount corresponding to a specified number of code bits, first correlation detecting means comprising a first reverse spread means for generating a first reverse spread signal by reversely spreading said first spread signal with said first pseudo noise signal, first signal extracting means for extracting a signal element of said first reverse spread signal and first detecting means for detecting an extracted signal element of said first signal extracting means by an envelope detecting method, second correlation detecting means comprising a second reverse spread means for generating a second reverse spread signal by reversely spreading said second spread signal with said second pseudo noise signal, second signal extracting means for extracting a signal element of said second reverse spread signal, and second detecting means for detecting an extracted signal element of said second signal extracting means by an envelope detecting method, third correlation detecting means comprising a third reverse spread means for generating a third reverse spread signal by reversely spreading said third spread signal with said third pseudo noise signal, third signal extracting means for extracting a signal element of said third reverse spread signal and a third detecting means for detecting an extracted signal element of said third signal extracting means by an envelope detecting method, hybrid means for generating a signal corresponding to a difference between an output of said second correlation detecting means and an output of said third correlation detecting means, synchronization control means for setting a bit rate shifted by a specified value from the bit rate of a pseudo noise signal included in said received spread spectrum signal, and for executing an initial seizing control operation to adjust the bit rate to be substantially equal to the bit rate of the pseudo noise signal included in said received spread spectrum signal when an output of said first correlation detecting means becomes higher than a specified level and for continuously executing a synchronization sustaining control operation after the bit rate is adjusted in said initial seizing control operation to hold an output of said hybrid means to a reference level by monitoring an output of said first correlation detecting means and an output of said hybrid means and adjusting the bit rates from time to time, activating means for activating said pseudo noise generating means based on the bit rate set by said synchronization control means, demodulating means connected to said synchronization control means for extracting data included in said spread spectrum signal, Costas Loop demodulating means, first prelock detecting means for detecting a first prelock signal when an output of said first correlation detecting means exceeds the preset level, second prelock detecting means for detecting a second prelock signal when the amplitude of an output of a multiplying means of said Costas Loop demodulating means is within the preset range, and lock detecting means for detecting a lock condition of said Costas Loop demodulating means when said first prelock signal and second prelock signal exist.

19. A receiver for use in a spread spectrum communication system according to claim 18, wherein said Costas Loop demodulating means comprises:

oscillator means for oscillating a first demodulating signal, second phase shift means for generating a second demodulating signal which deviates in phase by substantially 90° from said demodulating signal, first multiplying means for multiplying a first reverse spread signal generated from the first reverse spread of said first correlation detecting means and said first demodulating signal, second multiplying means for multiplying said first reverse spread signal and said second demodulating signal, third multiplying means for multiplying an output of said first multiplying means and an output of said second multiplying means, and frequency control means for controlling the oscillation frequency of the oscillation means in accordance with a mean value of an output of said third multiplying means.

20. A receiver for use in a spread spectrum communication system according to claim 19, wherein said first prelock detecting means comprises binary encoding means, said second prelock detecting means comprises full-wave rectifying means and binary encoding means, and said lock detecting means comprises a logic gate.

* * * * *